(12) United States Patent
Earnshaw et al.

(10) Patent No.: US 8,638,815 B2
(45) Date of Patent: Jan. 28, 2014

(54) METHOD AND APPARATUS FOR LOGICAL CHANNEL PRIORITIZATION FOR UPLINK CARRIER AGGREGATION

(75) Inventors: Mark Earnshaw, Kanata (CA); Mo-Han Fong, Kanata (CA); Hua Xu, Kanata (CA); Youn Hyoung Heo, Waterloo (CA); Zhijun Cal, Irving, TX (US)

(73) Assignee: BlackBerry Limited, Waterloo (CA)

( * ) Notice: Subject to any disclaimer, the term of this patent is extended or adjusted under 35 U.S.C. 154(b) by 126 days.

(21) Appl. No.: 12/684,200

(22) Filed: Jan. 8, 2010

(65) Prior Publication Data

US 2011/0170495 A1   Jul. 14, 2011

(51) Int. Cl.
*H04J 3/16* (2006.01)
*H04J 11/00* (2006.01)
*H04L 12/28* (2006.01)

(52) U.S. Cl.
USPC ............... 370/468; 370/203; 370/395.21

(58) Field of Classification Search
USPC ......... 370/328, 329, 203, 208, 209, 319, 341, 370/396, 397, 398, 399, 395.21, 395.41, 370/395.42, 395.43, 409, 468, 469, 470, 370/472; 455/512, 509, 450, 452.1, 452.2, 455/454
See application file for complete search history.

(56) References Cited

U.S. PATENT DOCUMENTS

| | | | | |
|---|---|---|---|---|
| 8,295,779 B2* | 10/2012 | Cave et al. | ......................... | 455/69 |
| 8,358,814 B2* | 1/2013 | Monden | ......................... | 382/124 |
| 2004/0198386 A1 | 10/2004 | Dupray | | |
| 2009/0318152 A1* | 12/2009 | Maheshwari | .................. | 455/436 |
| 2010/0111023 A1* | 5/2010 | Pelletier et al. | ................ | 370/329 |
| 2010/0157895 A1* | 6/2010 | Pani et al. | ...................... | 370/328 |
| 2010/0220652 A1* | 9/2010 | Ishii et al. | ...................... | 370/328 |
| 2010/0254480 A1* | 10/2010 | Park et al. | ...................... | 375/295 |
| 2010/0281486 A1* | 11/2010 | Lu et al. | ......................... | 718/104 |

FOREIGN PATENT DOCUMENTS

| | | |
|---|---|---|
| WO | 2009035301 | 3/2009 |
| WO | 2010122833 | 10/2010 |

OTHER PUBLICATIONS

Translation of the Notice of Reasons for Rejection mailed Jul. 23, 2012, in corresponding Japanese patent application No. 2011-002529.
Notice of Reasons for Rejection mailed Jul. 23, 2012, in corresponding Japanese patent application No. 2011-002529.

(Continued)

*Primary Examiner* — Hanh N Nguyen
(74) *Attorney, Agent, or Firm* — Novak Druce Connolly Bove + Quigg LLP

(57) ABSTRACT

A method and apparatus for logical channel prioritization at a user equipment in a multiple uplink carrier system, the method receiving a set of logical channel priorities at the user equipment, the logical channel priorities being assigned on a per carrier basis; and applying the set of logical channel priorities to each logical channel for carrier selection. Further a method and apparatus for constructing an uplink medium access control protocol data unit at a user equipment in a multiple uplink carrier system, the method sorting possible logical channel and carrier pairings based on logical channel priorities; utilizing a prioritized bit rate process to allocate logical channel traffic in an order determined by the sorting; and performing a remaining resources process to allocate logical channel traffic based on a priority order.

26 Claims, 20 Drawing Sheets

(56) References Cited

OTHER PUBLICATIONS

TS 36.212, "3rd Generation Partnership Project; Technical Specification Group Radio Access Network; Evolved Universal Terrestrial Radio Access (E-UTRA); Multiplexing and channel coding (Release 8)", Version 8.7.0, May 2009;(retrieved from http://www.3gpp.org/ftp/Specs/html-info/36212.htm).

TS 36.300, "3rd Generation Partnership Project; Technical Specification Group Radio Access Network; Evolved Universal Terrestrial Radio Access (E-UTRA); Overall Description; Stage 2 (Release 8)", Version 8.10.0, Sep. 2009. (retrieved from http://www.3gpp.org/ftp/Specs/html-info/36300.htm).

TS 36.321, "3rd Generation Partnership Project; Technical Specification Group Radio Access Network; Evolved Universal Terrestrial Radio Access (E-UTRA); Medium Access Control (MAC) protocol specification (Release 8)", Version 8.7.0, Sep. 2009; (retrieved from http://www.3gpp.org/ftp/Specs/html-info/36321.htm).

TS 36.331, "3rd Generation Partnership Project; Technical Specification Group Radio Access Network; Evolved Universal Terrestrial Radio Access (E-UTRA); Radio Resource Control (RRC); Protocol specification (Release 8)", Version 8.7.0, Sep. 2009; (retrieved from http://www.3gpp.org/ftp/Specs/html-info/36331.htm).

LG Electronics Inc, "Logical channel prioritization for aggregated carriers", RAN2 #68, R2-096467, Nov. 9-13, 2009.; (retrieved from http://www.3gpp.org/ftp/tsg_ran/WG2_RL2/TSGR2_68/Docs/R2-096467.zip).

ZTE, "Mapping of logical channels to component carriers", RAN2 #68, R2-096768, Nov. 9-13, 2009. (retrieved from http://www.3gpp.org/ftp/tsg_ran/WG2_RL2/TSGR2_68/Docs/R2-096768.zip).

ZTE, "Logical channel prioritization for carrier aggregation", RAN2 #68, R2-096769, Oct. 9-13, 2009. (retrieved from http://www.3gpp.org/ftp/tsg_ran/WG2_RL2/TSGR2_68/Docs/R2-096769.zip).

\* cited by examiner

|  | Carrier 1 | Carrier 2 | Carrier 3 |
|---|---|---|---|
| Logical Channel 1 | 1 | 1 | 1 |
| Logical Channel 2 | 3 | 3 | 8 |
| Logical Channel 3 | 15 | 2 | Forbidden |

FIG. 15

| Sorting Position | Carrier | Logical Channel | Priority |
|---|---|---|---|
| 1 | 1 | 1 | 1 |
| 2 | 2 | 1 | 1 |
| 3 | 3 | 1 | 1 |
| 4 | 2 | 3 | 2 |
| 5 | 1 | 2 | 3 |
| 6 | 2 | 2 | 3 |
| 7 | 3 | 2 | 8 |
| 8 | 1 | 3 | 15 |

FIG. 16

|  |  | Remaining Grant Size ||| Bucket Contents ||| Pending Traffic |||
|---|---|---|---|---|---|---|---|---|---|---|
| Step | Action | $G_1$ | $G_2$ | $G_3$ | $B_1$ | $B_2$ | $B_3$ | $T_1$ | $T_2$ | $T_3$ |
| 0 | Initial Values | 100 | 200 | 300 | 100 | 150 | 75 | 50 | 800 | 800 |
| 1 | 50 bytes from LC1 to CC1 | 50 |  |  | 50 |  |  | 0 |  |  |
| 2 | None |  |  |  |  |  |  |  |  |  |
| 3 | None |  |  |  |  |  |  |  |  |  |
| 4 | 75 bytes from LC3 to CC2 |  | 125 |  |  |  | 0 |  |  | 725 |
| 5 | 50 bytes from LC2 to CC1 | 0 |  |  |  | 100 |  |  | 750 |  |
| 6 | 100 bytes from LC2 to CC2 |  | 25 |  |  | 0 |  |  | 650 |  |
| 7 | None |  |  |  |  |  |  |  |  |  |
| 8 | None |  |  |  |  |  |  |  |  |  |

1810 — Remaining Grant Size
1820 — Bucket Contents
1830 — Pending Traffic

FIG. 18

|  |  | Remaining Grant Size | | | Bucket Contents | | | Pending Traffic | | |
|---|---|---|---|---|---|---|---|---|---|---|
| Step | Action | $G_1$ | $G_2$ | $G_3$ | $B_1$ | $B_2$ | $B_3$ | $T_1$ | $T_2$ | $T_3$ |
| 0 | Initial Values | 0 | 25 | 300 | 50 | 0 | 0 | 0 | 650 | 725 |
| 1 | None | | | | | | | | | |
| 2 | None | | | | | | | | | |
| 3 | None | | | | | | | | | |
| 4 | 25 bytes from LC3 to CC2 | | 0 | | | | | | | 700 |
| 5 | None | | | | | | | | | |
| 6 | None | | | | | | | | | |
| 7 | 300 bytes from LC2 to CC3 | | | 0 | | | | | 350 | |
| 8 | None | | | | | | | | | |

1810 — Remaining Grant Size
1820 — Bucket Contents
1830 — Pending Traffic

FIG. 19

|  |  | Remaining Grant Size 1810 | | | Bucket Contents 1820 | | | Pending Traffic 1830 | | |
|---|---|---|---|---|---|---|---|---|---|---|
| Step | Action | $G_1$ | $G_2$ | $G_3$ | $B_1$ | $B_2$ | $B_3$ | $T_1$ | $T_2$ | $T_3$ |
| 0 | Initial Values | 100 | 200 | 300 | 100 | 150 | 75 | 50 | 800 | 800 |
| 1 | Reserve 50 bytes for LC1 on CC1 | 50 | | | 50 | | | 0 | | |
| 2 | Reserve 50 bytes for LC1 on CC2 | | 150 | | | | | | | |
| 3 | Reserve 50 bytes for LC1 on CC3 | | | 250 | | | | | | |
| 4 | Assign 75 bytes from LC3 to CC2 | | 75 | | | | 0 | | | 725 |
| 5A | Cancel LC1 reservation of 50 bytes on CC1 | 100 | | | | | | | | |
| 5B | Assign 100 bytes for LC2 to CC1 | 0 | | | | 50 | | | 700 | |
| 6 | Assign 50 bytes from LC2 to CC2 | | 25 | | | 0 | | | 650 | |
| 7 | None | | | | | | | | | |
| 8 | None | | | | | | | | | |

FIG. 21

|  |  | Remaining Grant Size (1810) | | | Bucket Contents (1820) | | | Pending Traffic (1830) | | |
| --- | --- | --- | --- | --- | --- | --- | --- | --- | --- | --- |
| Step | Action | $G_1$ | $G_2$ | $G_3$ | $B_1$ | $B_2$ | $B_3$ | $T_1$ | $T_2$ | $T_3$ |
| 0 | Initial Values | 0 | 25 | 250 | 50 | 0 | 0 | 0 | 650 | 725 |
| 1 | None | | | | | | | | | |
| 2 | None | | | | | | | | | |
| 3 | None | | | | | | | | | |
| 4A | Cancel reservation of 50 Bytes for LC1 on CC2<br><br>Reservation of 50 bytes for LC1 on CC3 converts to An assignment | | 75 | | | | | | | |
| 4B | Assign 75 bytes from LC3 to CC2 | | 0 | | | | | | 650 | |
| 5 | None | | | | | | | | | |
| 6 | None | | | | | | | | | |
| 7 | Assign 250 bytes from LC3 To CC2 | | | 0 | | | | | 400 | |
| 8 | None | | | | | | | | | |

FIG. 22

METHOD AND APPARATUS FOR LOGICAL CHANNEL PRIORITIZATION FOR UPLINK CARRIER AGGREGATION

FIELD OF THE DISCLOSURE

The present disclosure relates to uplink transmissions from a User Equipment (UE) to a network element and in particular to uplink communications utilizing multiple carriers.

BACKGROUND

In various proposed systems, uplink traffic may require a minimum bandwidth to transfer data from a User Equipment (UE) to a network element. One way to achieve this is the use of multiple uplink carriers that may be aggregated for use by the UE in order to increase the available uplink throughput. One such system is the Long-Term Evolution-Advanced (LTE-A), which corresponds to the Evolved Universal Terrestrial Radio Access (E-UTRA) Release 10.

However, existing E-UTRA Release 8 logical channel prioritization schemes for local scheduling at the UE of logical channel traffic into Medium Access Control (MAC) Protocol Data Units (PDUs) has been designed for single carrier use. This scheme does not consider the use of multiple carriers, nor does it consider whether different uplink carriers may exhibit different characteristics nor the presence of multiple simultaneous uplink grants within the same subframe to a UE. The above also applies to other systems having a single uplink carrier which may also make use of multi-carrier aggregation.

BRIEF DESCRIPTION OF THE DRAWINGS

The present disclosure will be better understood with reference to the drawings, in which:

FIG. 15 is a block diagram showing an exemplary logical channel and carrier priority mapping;

FIG. 16 is a block diagram showing an exemplary sorting position based on logical channel and carrier priority mapping;

FIG. 18 is a block diagram showing an exemplary allocation of resources during a PBR (Prioritized Bit Rate) allocation step;

FIG. 19 is a block diagram showing an exemplary allocation of resources during a remaining resources allocation step;

FIG. 21 is a block diagram showing an exemplary allocation of resources in a reserve and remove system during the PBR step;

FIG. 22 is a block diagram showing an exemplary allocation of resources in a reserve and remove system during the remaining resources allocation step.

DETAILED DESCRIPTION OF THE DRAWINGS

Figure 1:
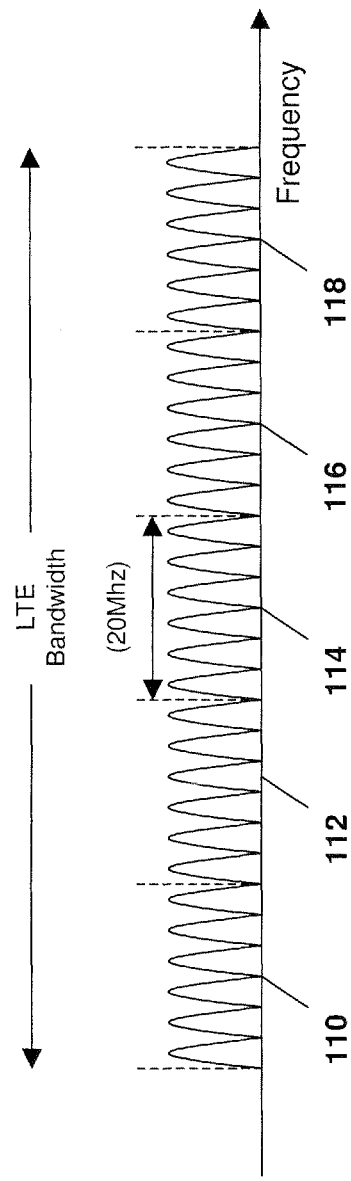
FIG. 1 is a frequency allocation diagram showing allocation of multiple carriers.

The present disclosure provides a method for logical channel prioritization at a user equipment in a system supporting multiple uplink carriers comprising: receiving a set of logical channel priorities at the user equipment, said logical channel priorities being assigned on a per carrier basis; and applying the set of logical channel priorities to each logical channel for carrier selection.

The present disclosure further provides a user equipment comprising: a communications subsystem; and a processor, the communications subsystem and processor cooperating to: receive a set of logical channel priorities at the user equipment, said logical channel priorities being assigned on a per carrier basis; and apply the set of logical channel priorities to each logical channel for carrier selection.

The present disclosure further provides a method for constructing an uplink medium access control protocol data unit at a user equipment in a multiple uplink carrier system comprising: receiving multiple uplink grants; sorting the multiple uplink grants from a highest priority grant to a lowest priority grant; and applying a logical channel prioritization scheme sequentially for the grants using logical channel priorities to allocate logical channel traffic to the medium access control protocol data unit.

The present disclosure still further provides a user equipment comprising: a communications subsystem; and a processor, the communications subsystem and processor cooperating to: receive multiple uplink grants; sort the multiple uplink grants from a highest priority grant to a lowest priority grant; and apply a logical channel prioritization scheme sequentially for the grants using logical channel priorities to allocate logical channel traffic to the medium access control protocol data unit.

The present disclosure still further provides a method for constructing an uplink medium access control protocol data unit at a user equipment in a multiple uplink carrier system comprising: sorting possible logical channel and carrier pairings based on logical channel priorities; utilizing a prioritized bit rate process to allocate logical channel traffic in an order determined by the sorting; and performing a remaining resources process to allocate logical channel traffic based on a priority order.

The present disclosure provides a user equipment comprising: a communications subsystem; and a processor, the communications subsystem and processor cooperating to: sort possible logical channel and carrier pairings based on logical channel priorities; utilize a prioritized bit rate process to allocate logical channel traffic in an order determined by the sorting; and perform a remaining resources process to allocate logical channel traffic based on a priority order.

The present disclosure further provides a method for transmitting an uplink medium access control ("MAC") control element from a user equipment in a multiple uplink carrier system, comprising: choosing at least one carrier from the multiple uplink carriers to transmit the MAC control element.

The present disclosure still further provides a network element comprising: a communications subsystem; and a processor, the communications subsystem and processor cooperating to: assign a set of logical channel priorities for a user equipment, said logical channel priorities being assigned on a per carrier basis; and transmit the logical channel priorities to the user equipment.

In the 3rd Generation Partnership Project (3GPP), carrier aggregation may be used for LTE-A in order to support wider transmission bandwidths enhancing increased potential peak data rates to meet LTE-A requirements. In uplink carrier aggregation, multiple uplink component carriers may be aggregated and can be allocated in a subframe to a UE.

The present disclosure is not however meant to be limited to LTE-A, and the methods and apparatus below could be applied to other multi-carrier aggregation situations.

Reference is now made to FIG. 1. FIG. 1 shows a frequency spectrum in which various bandwidths of 20 MHz have been allocated as carriers. In particular, five carriers are shown in the example of FIG. 1, each having a width of 20 MHz. These are illustrated by reference numerals 110, 112, 114, 116 and 118.

As will be appreciated by those in the art, the system and method of the present disclosure is not limited to having five uplink component carriers, and more or fewer component carriers can be used in a particular system. Further, the present disclosure is not meant to be limited to a bandwidth of 20 MHz and a greater or lesser bandwidth allocation is possible.

In the example of FIG. 1, five carriers with 20 MHz each are aggregated, and the total uplink system bandwidth is 100 MHz.

As will be appreciated by those in the art, dependent on the deployment scenario, carrier aggregation may occur with carriers located in the same frequency band or certain carriers may be located in non-adjacent or non-contiguous frequency bands. For example, one carrier may be located in the 2 GHz frequency band and a second non-adjacent aggregated carrier may be located at the 800 MHz frequency band.

Within the present disclosure, the terms carrier, component carrier and CC (Component Carrier) are used interchangeably.

Logical Channels

Figure 2:
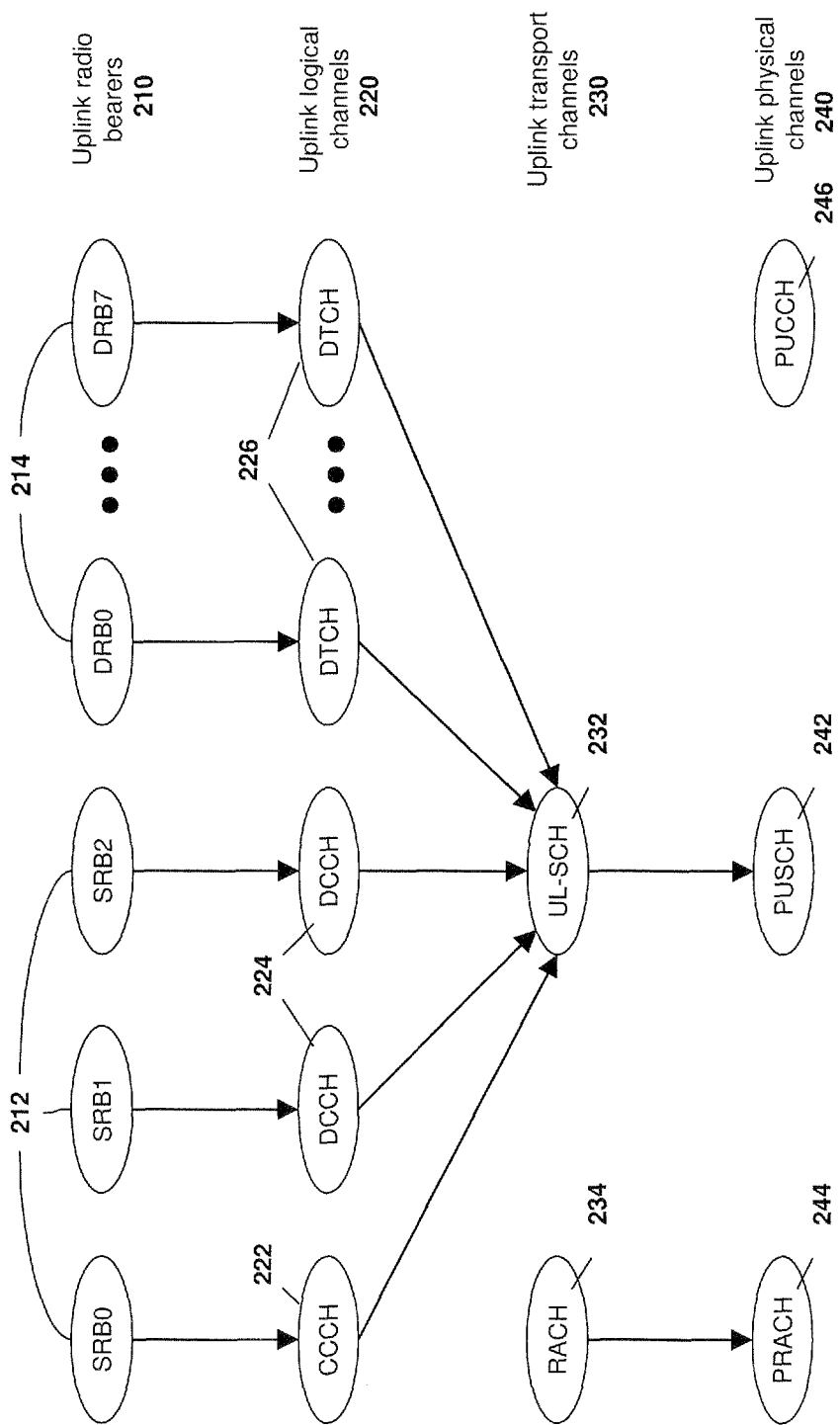
FIG. 2 is a schematic diagram showing uplink channel mappings.

Reference is now made to FIG. 2, which shows an example of logical channels. On the uplink, each radio barrier 210 maps onto a separate logical channel 220. Signaling Radio Bearers (SRBs) 212 carry control-plane signaling messages. SRB0 corresponds with the Common Control Channel (CCCH) 222 which is used only when an UE does not have a regular connection with a Dedicated Control Channel (DCCH) 224. The other two SRBs 212 map to separate DCCHs 224 after a connection has been established. In one embodiment, SRB1 is used to carry control-plane messages originating from the Radio Resource Control (RRC) layer, and SRB2 is used to carry control-plane messages originating from the Non-Access Stratum (NAS).

Data Radio Bearers (DRBs) 214 carry user-plane traffic. A separate Dedicated Traffic Channel (DTCH) 226 is set up for each active DRB. As will be appreciated, Radio Bearers can be considered to conceptually represent the interface between the RRC (Signaling Radio Bearers) or user-plane Internet Protocol (IP) and Layer 2. Further, logical channels 220 can be considered to represent specific Packet Data Convergence Protocol (PDCP) and Radio Link Control (RLC) entity pairings. Transport channels 230 can be considered conceptually to represent the interface between the Medium Access Control (MAC) and the physical layer. Physical channels 240 represent how data is actually carried over the air at the physical layer.

All of the uplink logical channels 220 map to the Uplink Shared Channel (UL-SCH) 232 at the transport channel 230 level, which in turn maps to the Physical Uplink Shared Channel (PUSCH) 242 for over-the-air transmission.

Separately, the Random Access Channel (RACH) 234 transport channel maps to the Physical Random Access Channel (PRACH) 244 physical channel for performing random accesses, and the Physical Uplink Control Channel (PUCCH) 246 physical channel carries physical layer signaling to the evolved Node B (eNB). In uplink carrier aggregation, there may be a separate PUSCH 242 for each individual uplink carrier, although only one PUSCH is shown with regard to the example of FIG. 2.

Figure 3:
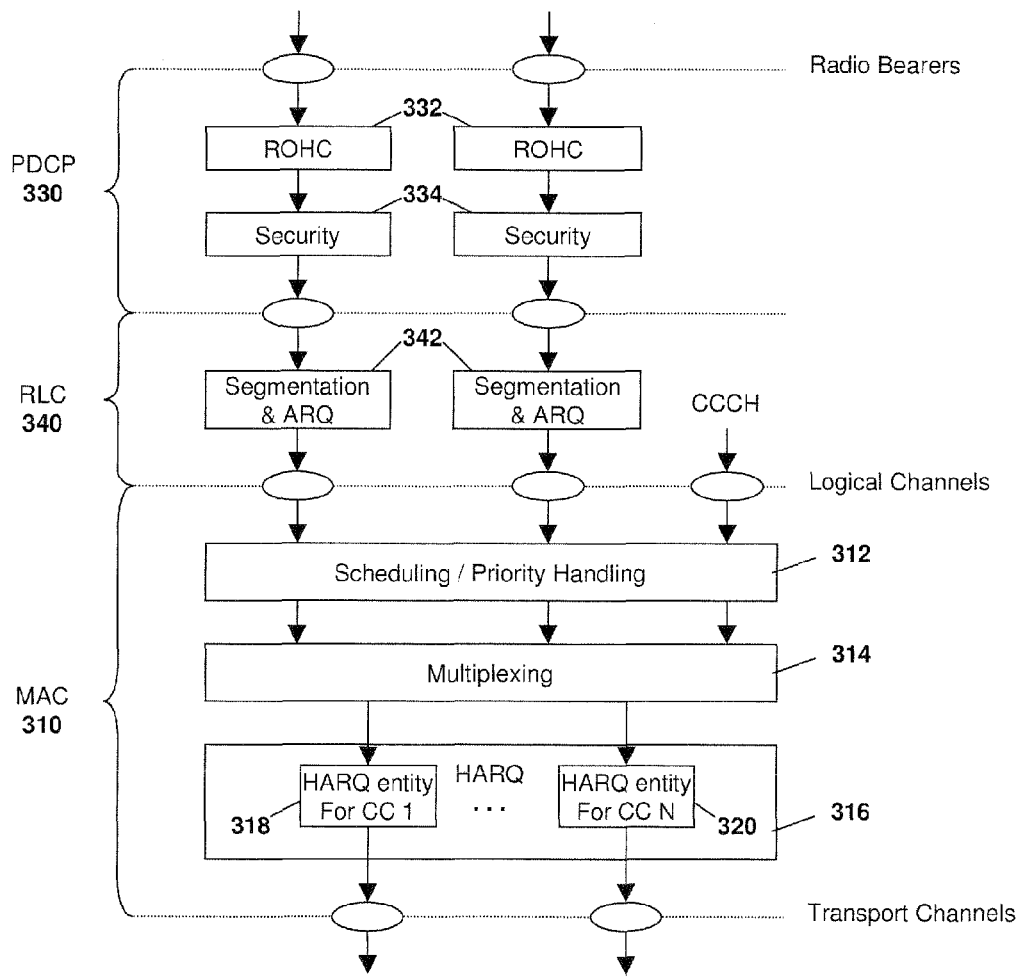
FIG. 3 is a schematic diagram showing a Layer 2 structure for uplink communication.

Reference is now made to FIG. 3. FIG. 3 shows the general structure and basic functionality of the three E-UTRA Layer 2 sublayers for the uplink. As will be appreciated by those in the art, the Transparent Mode RLC (TM RLC) entity used for the uplink common control channel is not shown in this figure since the only functionality of the TM RLC is transmission queuing.

As shown in FIG. 3, at the Packet Data Convergence Protocol (PDCP) layer 330, Robust Header Compression (ROHC) is performed at ROHC module 332 and security is provided at security module 334 prior to the data being provided to RLC layer 340. RLC layer 340 provides a segmentation and Automatic Repeat Request (ARQ) module 342.

The logical channel traffic is then provided to MAC layer 310.

Uplink MAC 310 is responsible for scheduling and priority handling of the multiple logical channels, and then multiplexing the scheduled traffic from the uplink logical channels into UL-SCH MAC Protocol Data Units (PDUs) that are then transmitted over the air by the physical layer.

In particular, a scheduling/priority handling module 312 creates scheduling and priority handling for each logical channel.

The logical channel traffic is then multiplexed in multiplexing module 314 and the Hybrid Automatic Repeat Request (HARQ) module 316 has a separate HARQ entity, shown as 318 and 320 in the example of FIG. 3, for each of the configured uplink Component Carriers (CCs). As will be appreciated, for simplicity only HARQ entries for CC 1 and CC N have actually been shown in the example of FIG. 3, where N is an integer not less than 1.

Figure 4:
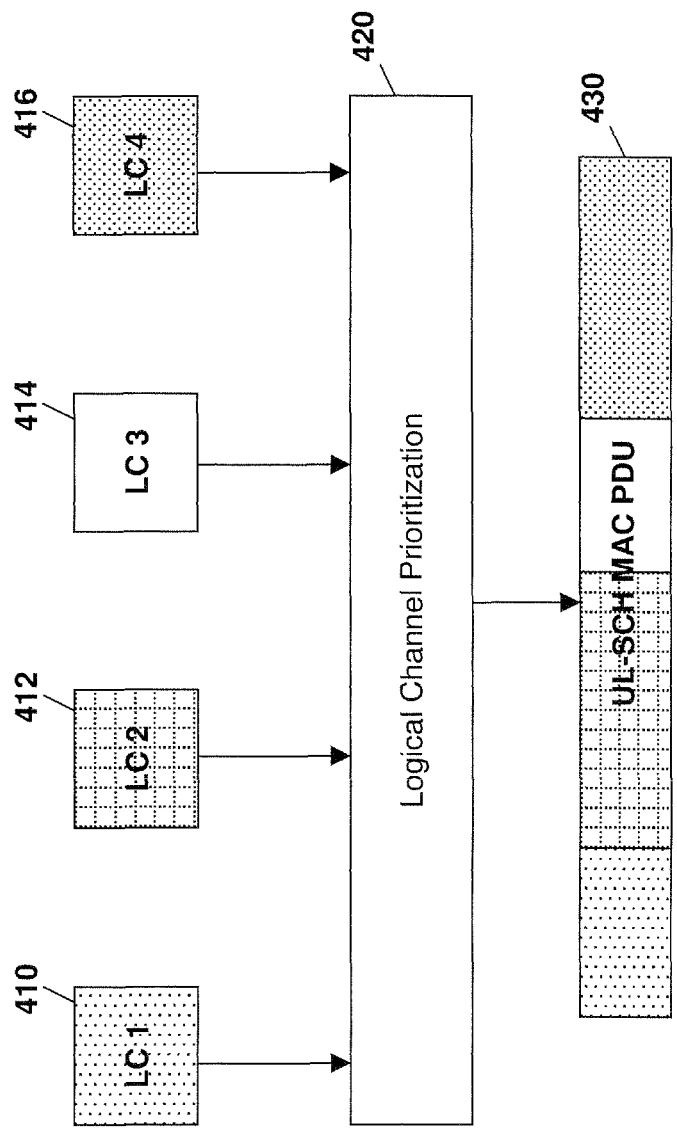
FIG. 4 is a schematic diagram showing an uplink shared channel Medium Access Control Protocol Data Unit (PDU) with multiplexed data from multiple logical channels.

The functionality of scheduling/priority handling module 312 and multiplexing module 314 is illustrated below with regard to FIG. 4, which shows an example Uplink Shared Channel (UL-SCH) MAC PDU resulting from the logical channel scheduling and multiplexing functionality. As can be seen in the example of FIG. 4, four logical channels for 410, 412, 414 and 416, are provided to the logical channel prioritization module 420, which then provides its output as multiplexed data 430. As will be seen in the example of the multiplexed data at block 430, the logical channels are multiplexed together.

Single Carrier Logical Channel Prioritization

The E-UTRA logical channel prioritization procedure is responsible for allocating uplink traffic from the active logical channels to any uplink resource assignments that are received. The procedure is outlined in Section 5.4.3.1 of the $3^{rd}$ Generation Partnership Project technical specification 36.321, TS 36.321 "$3^{rd}$ Generation Partnership Project; Technical Specification Group Radio Access Network; Evolved Universal Terrestrial Radio Access (E-UTRA); Medium Access Control (MAC) protocol specification (Release 8)", Version 8.7.0, 2009-09, the contents of which are incorporated herein by reference. The procedure is generally a leaky token bucket scheduler.

Figure 5:
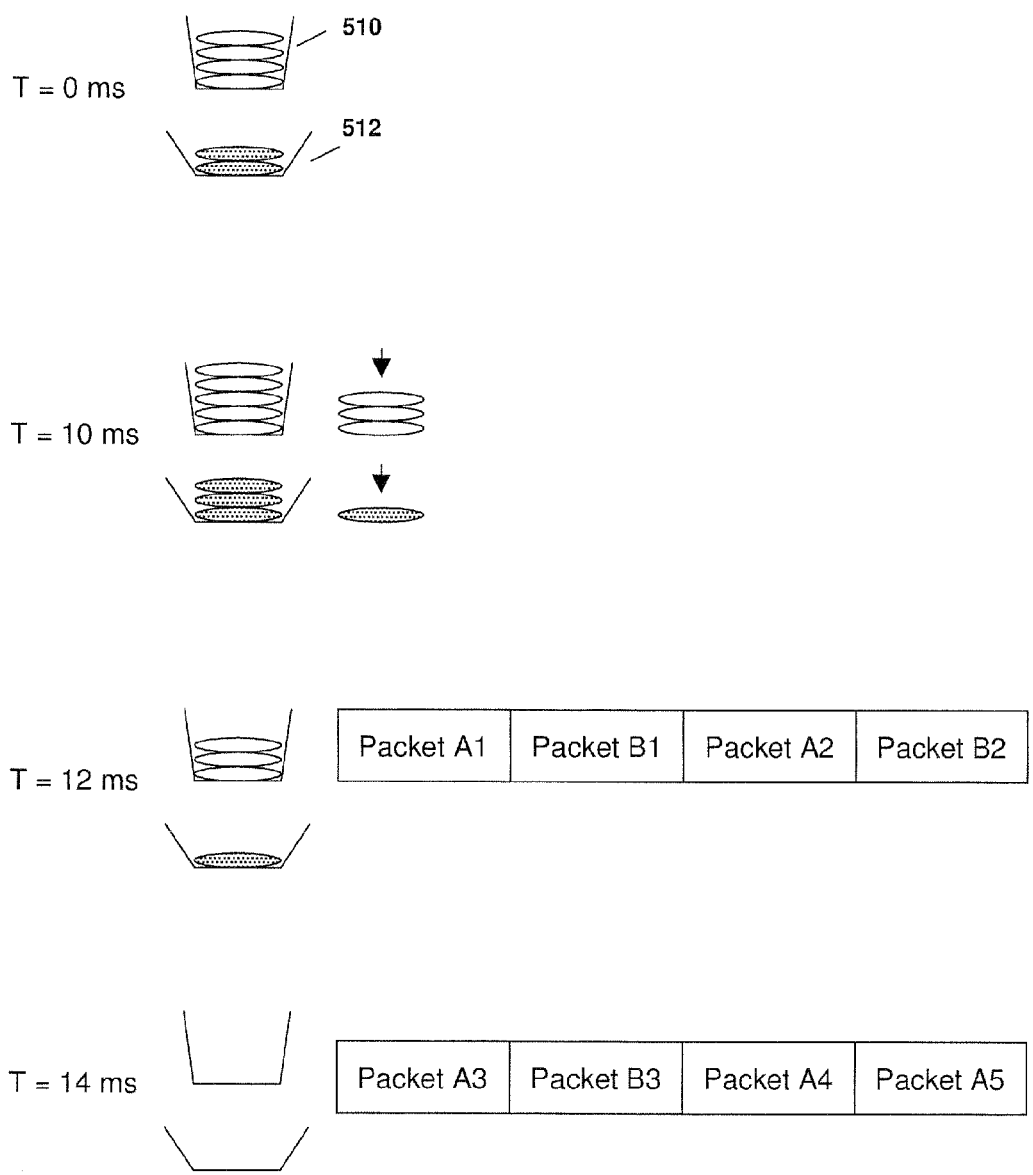
FIG. 5 is a block diagram showing an exemplary leaky token bucket system.

Reference is now made to FIG. 5. FIG. 5 illustrates a generic leaky token bucket scheduler example. This is not meant to be limiting to LTE algorithms or the present disclosure, but is meant to provide illustration of such a system. In the example of FIG. 5, a first bucket 510 and a second bucket 512 exist, and represent logical channels A and B, respectively. The buckets, as illustrated in FIG. 5, are different sizes and in particular, bucket 510 can accommodate five tokens whereas 512 can accommodate three tokens.

Each bucket has tokens added to it at a particular rate. In the example of FIG. 5, every 10 milliseconds, 4 tokens are added to bucket 510 and 2 tokens are added to bucket 512.

At the outset, bucket 510 has four tokens and bucket 512 has two tokens.

Thus, as seen in FIG. 5, at time 10 milliseconds, the 4 tokens are added to the bucket 510. However, since bucket 510 already had 4 tokens in it and has a maximum token capacity of 5, 3 tokens are lost.

Similarly, 2 tokens are added to bucket 512. However, since bucket 512 had 2 tokens in it and the bucket 512 has a maximum token capacity of 3 tokens, 1 token is lost.

At time 12 milliseconds, an uplink grant is provided which allows the resources associated with the tokens to be sent in the uplink direction. Each data packet or information that is to be sent requires a token to send it. In this example, the resource assignment that is received can handle 4 packets. Assuming that equal priorities are given to bucket 510 and 512, each bucket provides 2 tokens so that 2 packets are sent for each of the buckets.

At time 14 milliseconds, the second bucket 512 has only 1 token remaining and therefore only 1 packet associated with bucket 512 (i.e. packet B3) is sent at the 14 millisecond time marker. The remaining 3 tokens from bucket 510 are also utilized to fill the transmission with packets A3, A4 and A5.

Returning to LTE and in particular to channel prioritization for Release 8, with regard to logical channel configuration, a Prioritized Bit Rate (PBR) for each logical channel is provided by RRC. This determines the minimum bit rate at which the logical channel should be able to send data over a specified period of time. Available PBR settings for logical channels include 0, 8, 16, 32, 64, 128, 256 and infinity kilobytes per second, where 1 kilobyte is defined as equal to 1000 bytes. These parameters are defined in the PrioritizedBitRate field and the LogicalChannelConfig information elements found in Section 6.3.2 of TS 36.331, "$3^{rd}$ Generation Partnership Project; Technical Specification Group Radio Access Network; Evolved Universal Terrestrial Radio Access (E-UTRA); Radio Resource Control (RRC); Protocol specification (Release 8)", Version 8.7.0, 2009-09, the contents of which are incorporated herein by reference.

A Bucket Size Duration (BSD) value for each logical channel is also provided by RRC. Available bucket size durations include 50, 100, 150, 300, 500 and 1000 milliseconds, which is referred to as the BucketSizeDuration field of the LogicalChannelConfig information element in Section 6.3.2 of TS 36.331. The bucket size for a given logical channel may be obtained by multiplying the channel's PBR by the channel's BSD.

The bucket for each logical channel also includes a priority. In particular, MAC control elements, if available, are first to be scheduled to any uplink transmission allocation. As shown in Table 1 below, the relative priorities of different MAC control elements and logical channel traffic that are considered when the Uplink Scheduler is filling the MAC PDU are described. Generally, MAC control elements have higher priority than logical channel traffic with the exception of a padding BSR which has the lowest priority. Further, uplink CCCH traffic from SRB0 also has a higher priority than MAC control elements.

TABLE 1

RELATIVE PRIORITIES IN DECREASING ORDER
MAC Payload Type

C-RNTI MAC control element                          UL-CCCH traffic
BSR MAC control element (with the exception of a Padding BSR)
PHR MAC control element
Traffic from any logical channel (except for UL-CCCH)
Padding BSR MAC control element (only included if there is sufficient padding space and a BSR MAC control element has not already been included in the MAC PDU)

Data traffic from the active control-plane, the user-plane logical channels, or both may then be scheduled. Each logical channel is assigned a priority (with increasing priority values indicating a lower priority level), a prioritized bit rate, and a bucket size duration.

$B_j$ represents the current bucket contents for logical channel j. This quantity is initialized at zero when the logical channel is first established and is incremented by the $PBR_j$ (which may be normalized to units of bytes per subframe) for each subframe. The bucket contents $B_j$ at any particular time are typically hard-limited to never exceed a Maximum Bucket Size ($MBS_j$).

When a new transmission is performed, the UE allocates resources within the current uplink MAC PDU to active logical channels by the following:

(0) Any pending UL-CCCH traffic and/or MAC control elements (with the exception of a Padding BSR) are allocated space within the MAC PDU before any of the other logical channels are processed. The relative priorities of the MAC control elements and UL-CCCH traffic are given in Table 1.

(1) All of the logical channels with a currently positive $B_j$ (i.e. $B_j>0$) are allocated resources according to their current value of $B_j$ in a decreasing priority order. If the PBR of a logical channel is set to infinity, then resources will be assigned to that logical channel until (a) the MAC PDU is full, or (b) that logical channel has no more pending data, before any lower priority logical channels are serviced. If multiple logical channels have a currently positive $B_j$ and are of equal priority, then the order in which these logical channels are served is implementation-dependent (i.e. is not specified in the standard).

(2) The value of $B_j$ is decremented by the amount of data served to logical channel j in Step (1). Note that $B_j$ is allowed to become negative.

(3) If any resources remain, all logical channels are served in a strict decreasing priority order (regardless of the current value of $B_j$) until either the current logical channel has no more data to send (at which point the next highest priority logical channel with pending data is served) or the MAC PDU is full. ($B_j$ is not adjusted by any resources that are granted to logical channel j by this procedural step.)

As used herein, steps 1 and 2 together may be referred to collectively as the PBR allocation procedural step, and step 3 may be referred to as the remaining resource allocation procedural step. In particular, referring back to FIG. 5, the procedural steps of 1 and 2 are used to allocate the resources associated with tokens to the uplink channel PDU. However, the PDU may have leftover room remaining after all of the token allocation. That left-over room is then provisioned based on the remaining resource allocation procedure.

As will be further appreciated, the segmenting of various data by RLC may introduce extra overhead since headers need to be added to the segmented portions. The following rules shall also be followed:

1. When scheduling, if possible the UE should not segment an RLC service data unit (SDU) or partially transmitted RLC SDU or retransmitted RLC PDU) if the whole SDU (or partially transmitted RLC SDU or retransmitted RLC PDU) fits into the remaining MAC PDU resources.
2. If the UE (RLC) segments an RLC SDU, it should maximize the size of the segment to fill as much of the remaining MAC PDU resource as possible; and
3. The UE should maximize the transmission of data, which implies that RLC and MAC header overhead should be minimized where possible and that the use of padding should be minimized as much as possible.

A logical channel has various parameters defined in Section 6.3.2 of TS 36.331. These are shown below with regard to Table 2:

TABLE 2

Logical Channel Configuration Parameters

| Parameter | Description | Possible Values |
|---|---|---|
| Priority | Assigns a priority level to the logical channel. Smaller numeric values correspond to higher priority levels (i.e. 1 is the highest priority). | 1-16 |
| Prioritized Bit Rate (PBR) | Provides a "guaranteed" bit rate that should be achieved for the corresponding logical channel (provided that the eNB assigns sufficient uplink resources). | 0, 8, 16, 32, 64, 128, 256, Infinity (kB/s, kilobytes (1000 bytes) per second) |
| Bucket Size Duration | Used for resource allocation during logical channel prioritization by the UE on the uplink. | 50, 100, 150, 300, 500, 1000 (ms) |
| Logical Channel Group (LCG) | Optionally assigns this channel to a Logical Channel Group, which may also include other logical channels. LCGs are used when the UE generates BSRs (Buffer Status Reports). | 0-3 |

The channel priorities, Prioritized Bit Rate and Bucket Size Durations are used during logical channel prioritization procedures as described above. The logical channel group configuration is used for reporting buffer status information through buffer status reports.

Also, as defined in Sections 9.1.2, 9.2.1.1, and 9.2.1.2 of TS 36.331, control-plane messages are given the highest priority in terms of priority level (priority is 1 for uplink CCCH and SRB1, and priority is 3 for SRB2) and the PBR is set to infinity. All three of these control-plane logical channels are grouped together into Logical Channel Group 0. Each user-plane logical channel (i.e. DRBs) would likely be placed into one of the other three Logical Channel Groups (LCGs), although this is up to the eNB implementation.

As will be appreciated from the above, the logical channel prioritization algorithm described above is designed to work with a single uplink carrier. However, in a scenario where multiple uplink carriers are allocated, the solution may not work very well. Various factors including the fact that uplink carriers may have different coverage characteristics and performance and that multiple uplink grants may be received for the same subframe and can therefore be processed at the same time may cause the above single carrier algorithm to produce sub-optimal results.

Figure 6:
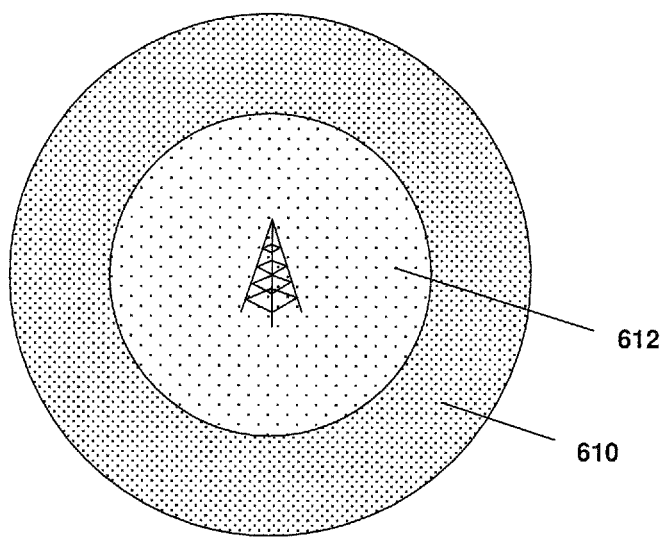
FIG. 6 is a block diagram showing exemplary cell coverage for different uplink carriers.

With regards to cell coverage, reference is made to FIG. 6. FIG. 6 is an example in which two uplink carriers are shown, each having different cell coverage characteristics. In particular, a first carrier 610 has a broader coverage then a second carrier 612. There may be various reasons for such differences. For example, lower frequency carriers have lower building penetration losses and are less affected by other environmental attenuators such as tree foliage. Consequently, for a given transmission power setting at a UE, a lower frequency carrier may have wider cell coverage than a higher frequency carrier.

Different uplink carriers may also be subject to varying levels of uplink interference from other UEs that are transmitting at the same time and on the same resources, including but not limited to, neighboring cells. Depending upon possible uplink interference coordination between eNBs, the amount of uplink interference on different carriers may vary.

Different transmission modes (such as transmission diversity (TxD) and spatial multiplexing (SM)) could be used on the uplink for UEs with multiple transmit antennas. Depending upon factors such as carrier propagation and coverage characteristics, UE transmitter power, and UE PA (Power Amplifier) architecture, it is possible that different uplink carriers being transmitted from the same UE could be configured to use different transmission modes. This could also lead to different uplink carriers having different coverage characteristics and data throughput abilities.

Figure 7:
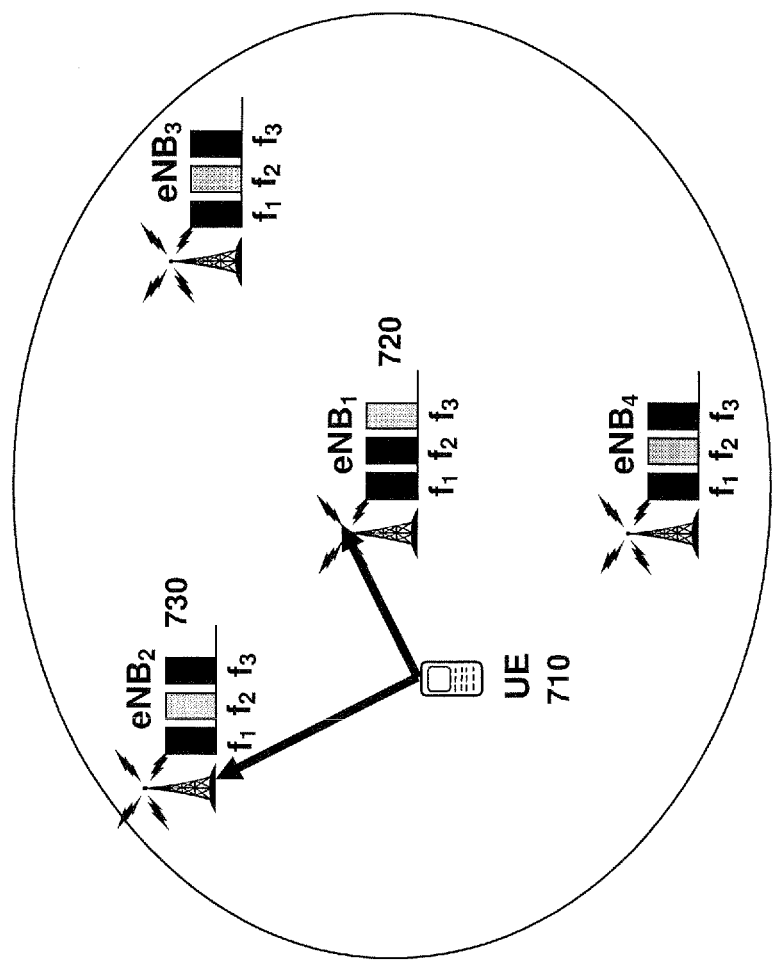
FIG. 7 is a schematic diagram showing an example of uplink virtual carriers.

In addition, a particular cell deployment may include a virtual uplink carrier where a cell may have its own uplink carriers, but may also be able to advertise and allocate virtual uplink carriers from neighboring cells. This is illustrated in FIG. 7 where the UE 710 transmits to a serving eNB 720 on uplink carrier $f_2$ and to eNB 730 on uplink carrier $f_3$, which the UE 710 believes is an uplink carrier associated with eNB 720. Since transmissions on different uplink carriers are actually directed to completely different eNBs in this deployment scenario, it would generally be expected that the transmission channel conditions for a virtual carrier as compared to a non-virtual carrier could be quite different, even if the two carriers are adjacent or nearly adjacent in frequency.

In addition, different uplink carriers may have different traffic loadings, depending on what other UEs are active within the same cell. Some UEs may only be single-carrier capable, or may only be able to operate on a subset of all of the uplink carriers that are available from a particular eNB. For an uplink carrier that is heavily loaded, it may be more difficult for the eNB to schedule quick uplink HARQ retransmissions when such retransmissions are required. That is, on a lightly loaded carrier, uplink HARQ retransmissions may be able to be scheduled with only the minimum 8 ms delay following the previous uplink HARQ transmission of the same data. However, on a heavily loaded carrier, uplink HARQ retransmissions may be subject to a greater delay due to the uplink resources having to be shared among a larger number of UEs. Depending upon the exact eNB scheduler design and traffic requests from other UEs, an eNB may be able to provide the same uplink resources for a synchronous non-adaptive UL HARQ retransmission 8 ms later, or a heavily loaded eNB may need to grant those resources to another higher-priority UE, thereby temporarily delaying UL HARQ retransmission opportunities for the first UE.

Further, as will be appreciated by those skilled in the art, in many wireless systems it is the main uplink scheduler which allocates the resources to the UEs. This uplink scheduler is located at the eNB, while the actual uplink data is located at the UE. In other words, there is no co-location of the primary scheduler and the pending uplink data. The uplink scheduler at the eNB has to rely on buffer status report signaling from the UE to know what uplink data is currently queued. Buffer status reports only provide a range rather than an exact value for the amount of uplink data pending. Further, these reports only report pending data on a per logical channel group basis. Multiple logical channels may be contained within the same logical channel group, in which case the eNB has no way of determining the exact amount of pending data for a particular logical channel. Further, due to signaling delays, the UE's buffer status may change as new data arrives between the time the buffer status report is signaled by the UE, an uplink grant is issued by the eNB and an uplink transmission is actually made by the UE.

Further, the eNB uplink scheduler only has limited control via the logical channel priority, prioritized bit rate and bucket size duration configurations, over which logical channel data is actually transmitted by the UE since the predefined logical channel prioritization algorithm is used at the UE. Any enhancement that can provide a greater degree of control to the central uplink scheduler may improve uplink performance.

Logical Channel Prioritization on a Per Carrier Basis

The present disclosure provides for logical channel priorities, which are used for uplink logical channel prioritization as described above, to be configured differently for each uplink carrier in a carrier aggregation scenario. This facilitates traffic from different logical channels being directed towards potentially different uplink carriers depending on the exact requirements of the traffic and the performance capabilities of the carriers. In addition, certain logical channels can be configured to be prevented from being transmitted on certain uplink carriers in one embodiment.

The Release 8 logical channel prioritization scheme of Section 5.4.3.1 of TS 36.321, assumes that the same set of logical channel priorities is always applied, regardless of which specific uplink carrier a MAC PDU is actually being constructed for.

However, in accordance with one embodiment of the present disclosure, different sets of logical channel priorities could be assigned on a per carrier basis. Further, instead of on a per carrier basis, the logical channel priorities could be assigned on a per carrier group basis, where a carrier group is a subset of the total configured carriers. The assigning of the logical channel priorities may be done when multiple uplink carriers are aggregated.

The assignment of multiple uplink carriers would instruct the UE to favor certain carriers for specific logical channels and would thus facilitate the matching of uplink carrier characteristics and uplink HARQ reliability to traffic originating from different user services on the UE. The traffic from a particular logical channel may still be able to be transmitted on any active uplink carrier however, even if that logical channel is configured to have a low priority for a particular uplink carrier, especially if no traffic is pending for the other logical channels.

Figure 8:
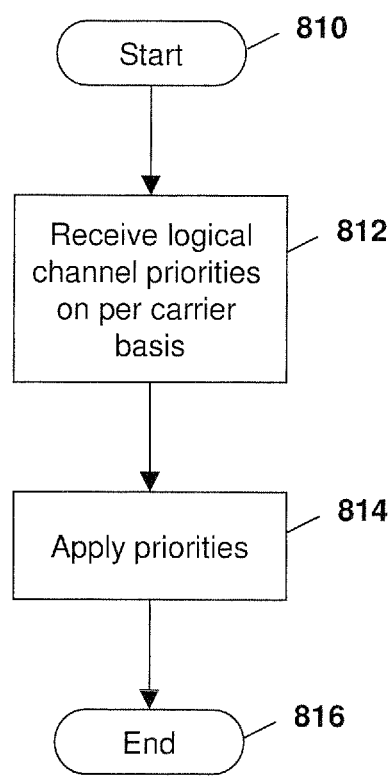
FIG. 8 is a flow diagram showing the application of logical channel priorities on a per carrier basis.

Reference is now made to FIG. 8. FIG. 8 shows a process diagram for a user equipment. The process starts at block 810 and proceeds to block 812 in which the UE receives a set of logical channel priorities on a per carrier basis. The process then proceeds to block 814 in which the set of logical channel priorities are applied to the logical channels for each of multiple aggregated carriers.

The process then proceeds to block 816 and ends.

In addition to currently available logical channel priority settings of 1-16, in one embodiment, an additional priority setting of "forbidden" could be added for a per carrier priority setting for a logical channel. As will be appreciated, such a designation is not possible on a single carrier uplink since there must always be an ability for each logical channel to transmit in the uplink direction. However, for multiple carriers it may be possible that a logical channel would be forbidden from transmitting on one or more of the carriers. The "forbidden" designation could utilize an existing priority setting such as the use of priority setting "16" to designate the forbidden value in one embodiment. Alternatively, other priority settings could be added.

Figure 9:
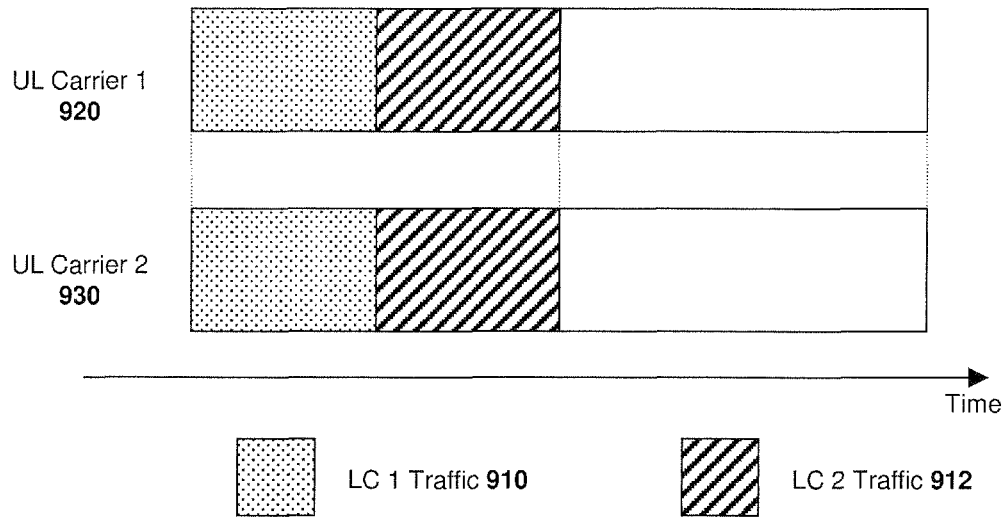
FIG. 9 is a schematic diagram showing two uplink carriers in which traffic is allocated utilizing Release 8 techniques.

As an illustrative example, an UE operating with two active uplink carriers and two logical channels exists. Each logical channel has the same relative priority and PBR. Assume that, for a particular subframe, uplink grants are received for each of the two active carriers. In this case, the use of a Release 8 logical channel prioritization algorithm when processing the simultaneous uplink grants sequentially may result in the UE filling half of each MAC PDU with data for each of the two logical channels. This is shown with reference to FIG. 9. As seen, the first logical channel traffic 910 fills half of the subframe for uplink carrier 920. The second logical channel traffic 912 fills the other half of the subframe for uplink carrier 920. Further, the first logical channel traffic 910 fills half of the subframe for uplink carrier 930 and similarly, logical channel traffic 912 fills the other half of the subframe for uplink carrier 930. As will be appreciated by those in the art, the splitting of the data between two carriers creates extra overhead in the header information that needs to be provided in each of the segments on each carrier. Thus, two additional headers would be required if the approach of FIG. 9 is utilized.

Figure 10:
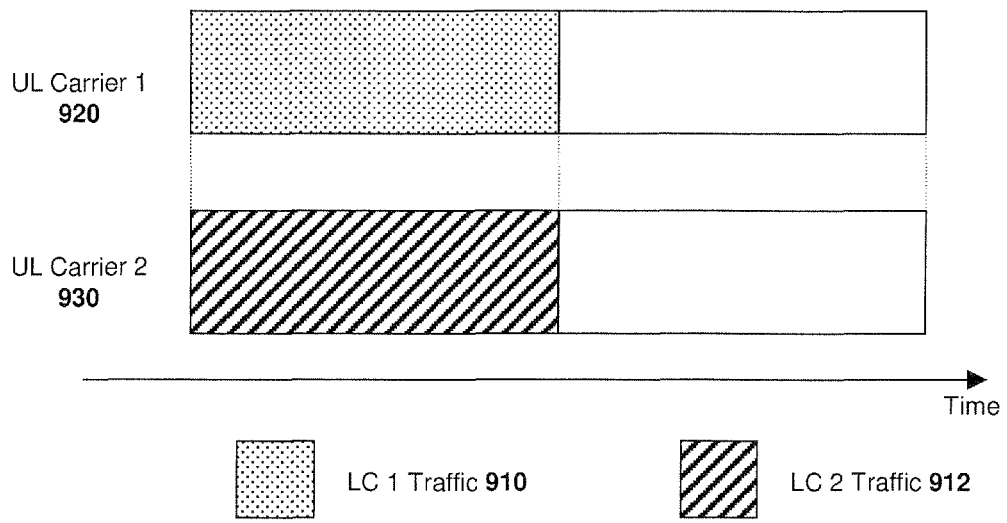
FIG. 10 is a schematic diagram showing two uplink carriers in which logical channels are prioritized per carrier.

Referring to FIG. 10, if the logical channels are now assigned different priorities for each of two carriers, then logical channel traffic 910 utilizes the entire subframe of uplink carrier 920. Further logical channel traffic 912 utilizes the entire subframe of uplink carrier 930. In this case, logical channel 910 may be configured such that carrier 920 has priority 1 and carrier 930 has priority 2. Conversely, logical channel 912 may be configured such that carrier 930 has priority 1 and carrier 920 has priority 2. The end result of designating the priorities as described above is that the MAC PDU contents would be as shown in FIG. 10. Here carrier 920 is only carrying traffic from the first logical channel and carrier 930 is only carrying traffic from the second logical channel. This makes it easier for the eNB to provide different levels of uplink HARQ reliability to the different services represented by the two logical channels in the example. In addition, it is likely that fewer RLC PDUs will need to be generated for the case of FIG. 10 as compared with that of FIG. 9. This reduces the amount of RLC and MAC header overhead that is required.

Figure 11:
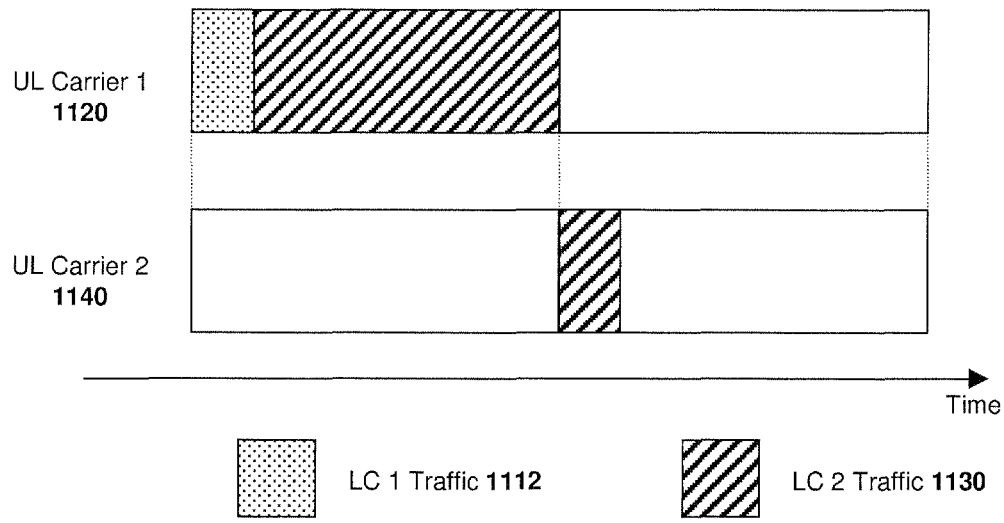
FIG. 11 is a schematic diagram showing two uplink carriers in which traffic is allocated based on logical channel priority.

A similar benefit can be obtained when the eNB can use the different logical channel priority sets to control UE logical channel prioritization over a time period greater than one subframe. For example, assume that the UE is conducting a semi-persistent scheduling (SPS) voice conversation while simultaneously uploading a large amount of data. Two logical channels therefore exist, and it can be reasonably assumed that the real-time voice service logical channel's priority is configured to be higher then the non-real-time file transfer logical channel's priority. In addition, two uplink carriers have been assigned to the UE. Reference is now made to FIG. 11.

If the voice service assigned logical channel priorities are such that it can transmit on either carrier, then the situation of FIG. 11 may result. Here, the UE has been issued a large uplink grant for a particular subframe. The logical channel priorities are such that the small voice packet which is the highest priority is inserted at the beginning of the MAC PDU of the first subframe, shown as traffic 1112 in carrier 1120. The remainder of the subframe on carrier 1120 includes the large amount of file data, shown as traffic 1130.

In the next subframe, however, there is no data to send in the small SPS configured uplink grant that was originally intended for the voice traffic. Hence, this MAC PDU is filled with file data, which is traffic 1130. The end result is unnecessary traffic fragmentation leading to extra RLC MAC header overhead.

Figure 12:
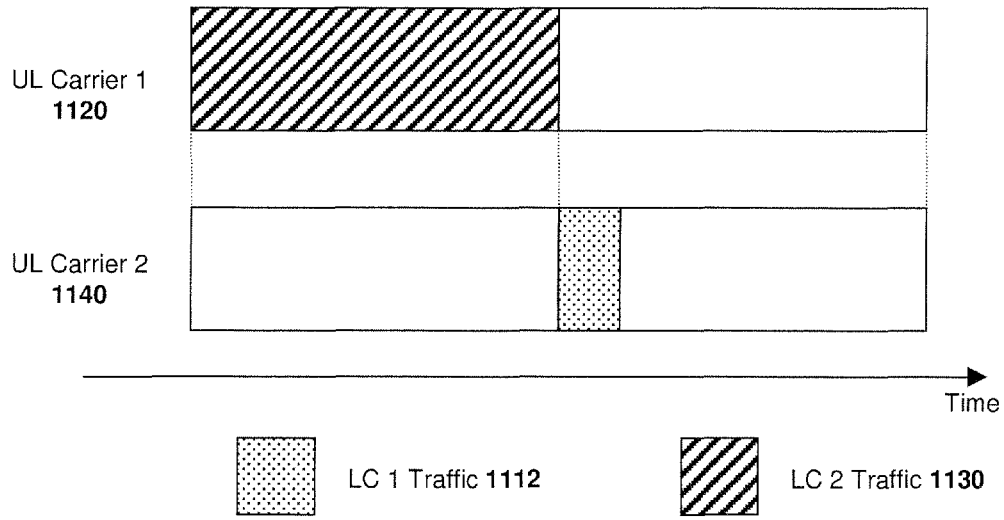
FIG. 12 is a schematic diagram showing two uplink carriers in which transmission by a logical channel on a carrier is forbidden.

If, however, the first logical channel which carries the voice traffic 1112 is forbidden from transmitting on carrier 1120, then the same set of uplink grants will result in the situation illustrated by FIG. 12. Here the logical channel priority settings result in a first large uplink grant on carrier 1120 being filled only with the file traffic 1130 from the second logical channel. The voice traffic 1112 from the first logical channel is "intentionally" delayed by the logical channel priority settings so that the voice packet will be inserted into the smaller uplink grant on carrier 1140 in the following subframe. This results in less traffic fragmentation, resulting in lower overhead, and facilitates any necessary uplink HARQ transmissions of real-time voice traffic (which is intentionally encapsulated into a small MAC PDU).

In a further embodiment, the examples of FIGS. 11 and 12 could be reduced to a single uplink carrier case of E-UTRA Release 8. In this situation, if the UE has an SPS service such as voice that is currently active as well as performing other data transfer on different logical channels, then when an SPS grant is configured, the UE knows in advance when it will be able to transmit SPS data. Hence, if the situation such as that shown in FIGS. 11 and 12 above occurs, where a large grant is given for one subframe while voice traffic is pending, but the UE knows that an existing SPS configuration will allow it to transmit the SPS traffic a short time later, then even if the SPS logical channel has a higher priority relative to the other logical channel, the UE may defer multiplexing the SPS data into the large MAC PDU and should instead wait to use the smaller MAC PDU corresponding with the SPS grant. This also provides a benefit to simplify the eNB scheduler operations.

In general, the proposed solution is to associate logical channel priorities with a certain resource dimension where the resource dimension can be component carriers, subframes or a combination of both. Further, as will be appreciated by those skilled in the art, the above approach may be used to maintain existing flexibility of uplink logical channel prioritization and provide potential additional flexibility if so desired. That is, the use of the Release 8 logical channel prioritization approach by the UE is still available to the eNB when the eNB signals to the UE to use a single logical channel configuration (i.e. logical channel priorities) that applies equally to all uplink carriers or else uses the same logical channel configuration and logical channel priorities for each configured uplink carrier. Hence, no functionality is taken away from E-UTRA Release 8, but additional flexibility is made available if desired. That is, backward compatibility with E-UTRA Release 8 is maintained.

The above may be implemented in Section 5.4.3.1 of the 36.321 technical specification. In particular, the amended technical specification may for example have the following language (where modifications have been shown in boldface text):

5.4.3.1 Logical Channel Prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

When multiple uplink carriers have been configured, logical channel prioritization shall use the logical channel priorities configured for the carrier to which the uplink grant corresponds. The priority for a logical channel on a particular uplink carrier may be configured to "Forbidden", in which case the corresponding logical channel shall not be considered for transmission on that carrier.

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement Bj by the total size of MAC SDUs served to logical channel j in Step 1

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximise the transmission of data.

The UE shall not transmit data for a logical channel corresponding to a radio bearer that is suspended (the conditions for when a radio bearer is considered suspended are defined in [8]).

A first option for configuration is semi-static configuration via RRC signaling. In particular, the approach would assign specific priorities for each configured uplink carrier whenever a new logical channel is configured. This may require modification of the LogicalChannelConfig information element in Section 6.3.2 of TS 36.331. Additionally, if a new uplink carrier is added to the existing configuration, logical channel priority values may be provided that correspond to that new uplink carrier for all currently configured logical channels. The LogicalChannelConfig information element or other equivalent information element can be included in the same RRC signaling message that configures the uplink component carrier assignment for the UE.

Reference is made to Table 3, which shows the modified LogicalChannelConfig field descriptions (where modifications have been shown in boldface text). As seen in Table 3 below, the priority in the LogicalChannelConfig field description has been amended to include that logical channel priorities are provided for a maximum number of uplink carriers, even if not all of these carriers are configured at the UE. Further, a priority value of 16 is assumed to correspond to the "Forbidden" state.

TABLE 3

LogicalChannelConfig field descriptions priority

Logical channel priority in TS 36.321 [6]. Value is an integer. Logical channel priorities are provided for the maximum number of uplink carriers, even if not all of these carriers are configured at the UE. A priority value of 16 is assumed to correspond to 'Forbidden' (i.e. traffic from the logical channel shall not be sent on the corresponding uplink carrier).

prioritisedBitRate

Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2 bucketSizeDuration

Bucket Size Duration for logical channel prioritization in TS 36.321 [6]. Value in milliseconds. Value ms50 corresponds to 50 ms, ms100 corresponds to 100 ms and so on.

logicalChannelGroup

Mapping of logical channel to logical channel group for BSR reporting in TS 36.321 [6].

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

As seen from the above, the addition of the second paragraph which starts "When multiple uplink carriers have been configured . . . ", the specification is changed to allow logical channel priorities to be configured for the carrier. Further, the use of the "Forbidden" priority is also provided for.

Association of Logical Channel Priorities with an Uplink Carrier

If the logical channel priorities are configured for different uplink carriers, as described above, then the configuration of the priorities may be performed based on the following.

Furthermore, the logical channel configuration information element may look like (where modifications have been shown in boldface text):

```
-- ASN1START
LogicalChannelConfig ::=    SEQUENCE {
    ul-SpecificParameters          SEQUENCE {
        priority                        SEQUENCE
(SIZE(1..maxULCarriers)) OF INTEGER (1.. 16),
        prioritisedBitRate              ENUMERATED {
            kBps0, kBps8, kBps16, kBps32, kBps64, kBps128,
            kBps256, infinity, spare8, spare7, spare6,
            spare5, spare4, spare3, spare2, spare1},
        bucketSizeDuration
        ENUMERATED {
            ms50, ms100, ms150, ms300, ms500, ms1000, spare2,
            spare1},
        logicalChannelGroup             INTEGER
```

```
(0..3)                OPTIONAL
-- Need OR
    }                 OPTIONAL,
-- Cond UL
    ...
}
-- ASN1STOP
```

As seen, above, the priority in the above has been amended to become a sequence of elements from one to the maximum number of uplink carriers with each individual logical channel priority having an integer value from 1 to 16.

If it is desired to change the current configured logical channel priorities at the UE, a new LogicalChannelConfig may be sent via RRC signaling. This has the advantage that it is robust in terms of transmission reliability and RRC acknowledgment provided back to the eNB.

In an alternative embodiment, a semi-dynamic adaptation through MAC control elements is possible. This approach allows logical channel priorities for different uplink carriers to be modified more easily and more quickly by making use of MAC control elements. Here, multiple sets of logical channel priorities can be configured semi-statically via RRC signaling. In one embodiment, up to four logical channel priority sets could be configured. However, this is not meant to be limiting and in other embodiments other numbers of logical channel priority sets could be configured.

A MAC control element could then be used in a semi-dynamic fashion (where semi-dynamic is slower then dynamic but faster then semi-static) to associate a particular channel priority with one or more of the currently configured active uplink carriers. This would allow relatively fast reconfiguration of logical channel priorities for each uplink carrier at a given UE, but would not incur much signaling overhead since MAC control elements would be small and would only need to be sent when a remapping of logical channel priority sets to an uplink carrier is desired.

Figure 13:
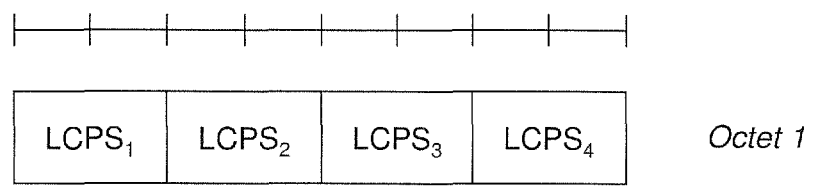
FIG. 13 is a schematic diagram showing a signaling octet utilized for allocating logical channel priority sets.

Reference is now made to FIG. 13, which shows an octet of the MAC control element that can assign one of four logical channel priority sets for each of four uplink carriers. Thus, if RRC signaling has configured four different sets of logical channel priorities, as an example, numbered 0 through 3 for the uplink carriers currently configured at the UE, a maximum of five uplink carriers can be activated at a UE, so in one embodiment a maximum of four different sets of logical channel priorities would provide sufficient flexibility for logical channel configuration purposes. If it is assumed that the uplink reference carrier always uses logical channel priority set 0 then a MAC control element would only need to be 1 byte in length in order to configure the remaining four uplink carriers, with an example of such a MAC control element being illustrated in FIG. 13. Here the logical channel priority sets (LCPS) can be signaled for up to four non-reference uplink carriers. Each logical channel priority set value is a 2-bit value that selects for a particular carrier from among four configured channel priority sets. If an eNB wishes to change the logical channel priority sets for only a subset of the currently configured uplink carriers, the eNB would simply reuse the existing LCPS values for the uplink carriers whose logical channel priority sets the eNB does not wish to change. In other words, if the eNB would like to change the value of the logical channel priority set for carrier 2, then the logical channel priority set values for carrier 1, carrier 3 and carrier 4 would remain the same as previously sent.

An example configuration of such logical channel priority sets is shown below with regard to Table 4. Here relative priorities for each configured logical channel, labeled 1 to 6 in the example below are given for each of four logical channel priority sets. However, as illustrated in Table 4 below, logical channel priority set 3 is not actually configured in this example.

Each 2-bit $LCPS_k$ value from FIG. 13 above would then select an LCPS from Table 4 to use on carrier k. For example, $LCPS_2$ may have a binary value of 01 indicating that carrier 2 should use LCPS 1 from Table 4 below. Binary field values of 00, 01, 10 and 11 would be used to indicate LCPS 0, 1, 2 and 3, respectively.

TABLE 4

| Logical | Logical Channel Priorities | | | |
|---|---|---|---|---|
| Channel | LCPS 0 | LCPS 1 | LCPS 2 | LCPS 3 |
| 1 | 0 | 0 | 0 | Not configured/ |
| 2 | 2 | 2 | 2 | Not used |
| 3 | 4 | Forbidden | 15 | |
| 4 | 4 | 15 | 15 | |
| 5 | 5 | 5 | Forbidden | |
| 6 | 5 | 5 | Forbidden | |

The LogicalChannelConfig field descriptions are shown below with regard to Table 5 for the use of logical channel priority sets (where modifications have been shown in boldface text). In particular, the priority field has been amended to indicate that logical channel priority values are provided for a maximum number of logical channel priority sets. A priority value of 16 is also assumed to correspond to "Forbidden".

TABLE 5

LogicalChannelConfig field descriptions priority

Logical channel priority in TS 36.321 [6]. Value is an integer. Logical channel priorities are provided for the maximum number of logical channel priority sets. A priority value of 16 is assumed to correspond to 'Forbidden' (i.e. traffic from the logical channel shall not be sent on the corresponding uplink carrier).

prioritisedBitRate

Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2

TABLE 5-continued

LogicalChannelConfig field descriptions bucketSizeDuration

Bucket Size Duration for logical channel prioritization in TS 36.321 [6]. Value in milliseconds. Value ms50 corresponds to 50 ms, ms100 corresponds to 100 ms and so on.
logicalChannelGroup Mapping of logical channel to logical channel group for BSR reporting in TS 36.321 [6].
Conditional presence        Explanation UL                          The field is mandatory present for UL logical channels;
                            otherwise it is not present.

Further, the information element could change to be (where modifications have been shown in boldface text):

```
-- ASN1START
LogicalChannelConfig ::=          SEQUENCE {
    ul-SpecificParameters         SEQUENCE { priority
                                  SEQUENCE
(SIZE(1..maxLogChanPrioritySets)) OF INTEGER (1..16),
        prioritisedBitRate                ENUMERATED {
        kBps0, kBps8, kBps16, kBps32, kBps64, kBps128,
        kBps256, infinity, spare8, spare7, spare6,
        spare5, spare4, spare3, spare2, spare1},
        bucketSizeDuration                ENUMERATED {
        ms50, ms100, ms150, ms300, ms500, ms1000, spare2,
        spare1},
        logicalChannelGroup                       INTEGER
(0..3)               OPTIONAL       -- Need OR
    }                OPTIONAL,
                                       -- Cond UL
    ...
}
-- ASN1STOP
```

A further alternative approach to signal the priorities is by dynamic adaptation via downlink control information (DCI) signaling.

The downlink control information on the Physical Downlink Control Channel (PDCCH) that provides the uplink grant could be modified so that logical channel priorities for a particular grant could be changed dynamically. For example, if the approach of defining up to four logical channel priority sets through RRC signaling described above is used, a 2-bit field could be added to each DCI 0 (or uplink grant DCI) to indicate which set of logical channel priorities is to be used when generating a MAC PDU for the corresponding uplink grant. This approach would provide maximum flexibility and dynamically control the uplink logical channel prioritization scheme at the UE. The DCI change could be made to Section 5.3.3.1.1 of technical specification 36.212 of the 3GPP technical specifications. The specification change could look like (where modifications have been shown in boldface text):

5.3.3.1.1 Format 0

DCI format 0 is used for the scheduling of PUSCH.

The following information is transmitted by means of the DCI format 0:

Flag for format0/format1A differentiation—1 bit, where value 0 indicates format 0 and value 1 indicates format 1A Hopping flag—1 bit as defined in section 8.4 of [3]

Resource block assignment and hopping resource allocation—$\lceil \log_2(N_{RB}^{UL}(N_{RB}^{UL}+1)/2) \rceil$ bits For PUSCH hopping:

$N_{UL\_hop}$ MSB bits are used to obtain the value of $\tilde{n}_{PRB}(i)$ as indicated in subclause [8.4] of [3]

($\lceil \log_2(N_{RB}^{UL}(N_{RB}^{UL}+1)/2) \rceil N_{UL\_hop}$) bits provide the resource allocation of the first slot in the UL subframe For non-hopping PUSCH:

($\lceil \log_2(N_{RB}^{UL}(N_{RB}^{UL}+1)/2) \rceil$) bits provide the resource allocation in the UL subframe as defined in section 8.1 of [3]

Modulation and coding scheme and redundancy version—5 bits as defined in section 8.6 of [3]

New data indicator—1 bit

TPC command for scheduled PUSCH—2 bits as defined in section 5.1.1.1 of [3]

Cyclic shift for DM RS—3 bits as defined in section 5.5.2.1.1 of [2]

UL index—2 bits as defined in sections 5.1.1.1 and 8 of [3] (this field is present only for TDD operation with uplink-downlink configuration 0)

Downlink Assignment Index (DAI)—2 bits as defined in section 7.3 of [3] (this field is present only for TDD operation with uplink-downlink configurations 1-6)

CQI request—1 bit as defined in section 7.2.1 of [3]

LCPS selection—2 bits as defined in section 6.3.2 of [36.331]

If the number of information bits in format 0 is less than the payload size of for format 1A (including any padding bits appended to format 1A), zeros shall be appended to format 0 until the payload size equals that of format 1A.

As seen from above, a 2-bit LCPS selection field as defined in Section 6.3.2 of 36.331 is added to DCI format 0. This is not meant to be limiting and a shorter or longer LCPS field could be used depending upon the maximum number of LCPS sets that may be configured.

Further, in all of the above, it is possible for a particular logical channel to be configured with a priority of "Forbidden" on one or more aggregated uplink carriers. In such a situation, in one embodiment a check should be made to ensure that each configured logical channel is able to transmit on at least one uplink carrier. Thus, the logical channel should not be configured as "Forbidden" on all currently active uplink carriers so that a transmission blocking of a particular logical channel does not occur. The preference could be listed as a note within the appropriate technical specification (specification 36.321 or 36.331, depending upon the exact embodiment used for assigning logical channel priorities for multiple uplink carriers). Such a change may be as follows:

Note: When an eNB configures or reconfigures the priority for an uplink logical channel, or configures, reconfigures, or deactivates an uplink carrier, the eNB shall ensure that each configured logical channel at the UE is allowed to transmit on at least one active uplink carrier.

The UE may also, in one embodiment perform error checking when a carrier logical channel reconfiguration occurs or when a carrier deactivation occurs to ensure that each configured logical channel is still permitted to transmit on at least one currently active uplink carrier.

Resource Allocation Rules for Construction of MAC PDUs

Once the logical channels have been configured with priorities for uplink carriers, resource allocation may need to occur. When a UE receives multiple uplink grants across multiple uplink carriers for the same subframe, there is a question on how to fill grants from the various uplink logical channels. As will be appreciated, this is a packing problem and as such it is generally only possible to define a suboptimal algorithm due to a large number of different configurations and combinations that are possible based on the number of carriers, number of logical channels, relative priorities of logical channels on each carrier, prioritized bit rates, bucket size duration settings for each logical channel, amount of pending traffic per logical channel, among other factors.

Furthermore, as will be appreciated in the art, the complete filling of uplink grants when sufficient data is queued or available is generally desirable since the grants are otherwise wasted. One case where this may be seen is where there are one or more logical channels that are forbidden from transmitting on a particular uplink carrier. If uplink grants on other carriers are filled first, then conceivably a case could exist where space on an uplink grant is still available but the only remaining pending data is from logical channels that are forbidden from transmitting on the remaining carrier.

Generally, the prioritized bit rate for each logical channel should be met assuming sufficient uplink resources are granted by the eNB.

Further, generally the number of overall RLC PDUs that are generated across uplink grants should be minimized in order to minimize the amount of RLC PDU overhead and MAC PDU overhead.

In one embodiment, a semi-static configuration of relative priorities of uplink carriers is possible. In this embodiment, all uplink carriers are semi-statically assigned a relative priority through RRC signaling. These priorities determine the order in which uplink grants are processed when multiple uplink grants are received for the same subframe.

When a UE receives more than one uplink grant at the same time, the UE sorts the grants into order from the highest priority carrier to the lowest. Each grant is then processed sequentially following the existing logical channel prioritization scheme with the addition that the logical channel priorities for the current carrier are used. Thus, other than sorting of uplink grants, no consideration of having multiple uplink grants in the same subframe is made.

If multiple carriers have the same relative priority and simultaneous uplink grants are received for those carriers, then a tie-breaking rule can be applied when sorting those grants into order. Possibilities for such a tie-breaking rule would include options such as the following:

larger uplink grants are higher priority than smaller uplink grants smaller uplink grants are higher priority than larger uplink grants relative ordering of uplink grants for equal priority carriers can be pseudo-randomly determined.

Figure 14:
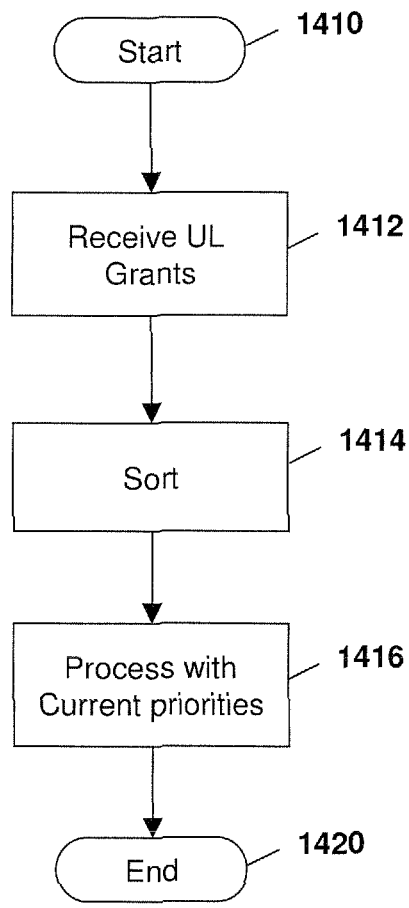
FIG. 14 is a flow diagram showing a process for allocating traffic upon receiving an uplink grant.

As will be appreciated, the above is relatively simple to implement and is illustrated with regard to FIG. 14 in which the process starts at block 1410 and proceeds to block 1412 in which the UE receives the uplink grants.

The process then proceeds to block 1414 in which the grants are sorted in order from the highest priority carrier to the lowest.

The process then proceeds to block 1416 in which the grants are processed following the existing logical channel prioritization scheme with the addition that the logical channel priorities for each current carrier are used.

The process then ends at block 1420.

Section 5.4.3.1 of TS 36.321 may be changed to accommodate the above. This is seen as follows (where modifications have been shown in boldface text):

5.4.3.1 Logical Channel Prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

When multiple uplink carriers have been configured and the UE receives multiple uplink grants for the same TTI, these grants shall be processed in the carrier order specified by higher layers.

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement Bj by the total size of MAC SDUs served to logical channel j in Step 1

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximise the transmission of data.

The UE shall not transmit data for a logical channel corresponding to a radio bearer that is suspended (the conditions for when a radio bearer is considered suspended are defined in [8]).

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

As seen from the above, the addition of the phrase "when multiple uplink carriers have been configured and the UE receives multiple uplink grants for the same TTI, these grants shall be processed in the carrier order specified by higher layers". This accomplishes the sorting process.

Holistic Consideration

In an alternative to the logical channel prioritization using semi-static configuration, a holistic consideration of available uplink resources could be utilized. This approach considers all available uplink grants for a particular subframe together when assigning logical channel traffic to specific MAC PDUs. The question then becomes in which order to deal with uplink grants and logical channels, especially if different logical channel priorities are in effect on different uplink carriers.

One solution is to consider all possible carrier and logical channel pairings, and sort them by priority. This may be illustrated through an example. Reference is now made to FIG. 15 which shows the priority of logical channels assigned to a particular carrier. In FIG. 15 logical channel 1 is assigned a priority of 1 for all three carriers. Logical channel 2 is assigned a priority of 3 for carrier 1, a priority of 3 for carrier 2 and a priority of 8 for carrier 3.

Logical channel 3 is assigned a priority of 15 for carrier 1, priority of 2 for carrier 2, and is forbidden from transmitting on carrier 3.

By way of example, assume that grants have been received for all uplink carriers with the grant sizes, in bytes, being $G_1=100$, $G_2=200$ and $G_3=300$ bytes respectively for carriers 1, 2 and 3. Further, assume that all three logical channels have pending traffic to send. The logical channels have current bucket contents in bytes of $B_1=100$, $B_2=150$ and $B_3=75$ and pending traffic sizes in bytes of $T_1=50$, $T_2=800$ and $T_3=800$.

In one embodiment, all carrier/logical channel combinations are sorted into order from the highest priority to the lowest priority. The result of this sorting is shown with regard to FIG. 16. Since logical channel 3 is forbidden from transmitting on carrier 3, in the embodiment of FIG. 16 this carrier/logical channel pairing is excluded from the sorted priority list of FIG. 16. Thus, sorting position 1 has carrier 1 with logical channel 1 having priority 1. Similarly, sorting position 2 has carrier 2 with logical channel 1 and a priority of 1 and so on.

As indicated above with regard to FIG. 5 and the description concerning LTE prioritization processes, the prioritization process is generally a two-step process where the first step involves allocating PBR resources for each logical channel and the second step involves allocating logical channel traffic to the remaining resources on a strict logical channel priority basis.

Figure 17:
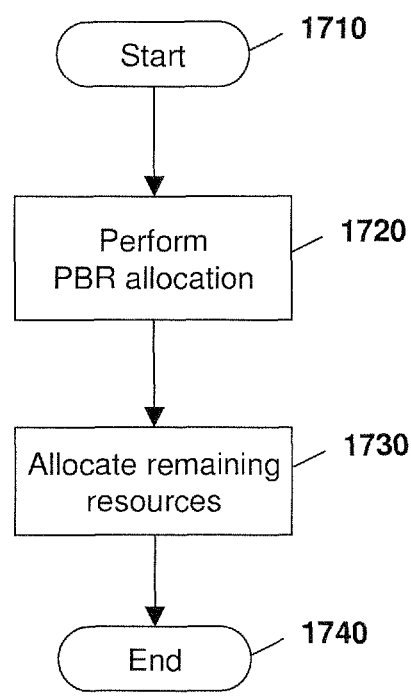
FIG. 17 is a flow diagram showing a process for allocating resources.

The use of the two-step process is illustrated with regard to FIG. 17, which starts at block 1710. The process then proceeds to block 1720 in which the prioritized bit rate allocation process is followed. PBR resources can generally be represented by tokens in a bucket. In the present example, each logical channel has particular bucket contents that are allocated through the PBR allocation process of block 1720.

Once the PBR allocation process is completed, the process proceeds to block 1730 in which the remaining resources (if any) are allocated. Thus, if there are remaining uplink grants that have not been fully utilized through the PBR allocation process, these are filled through the remaining resources block 1730.

The process then proceeds to block 1740 and ends.

For the PBR allocation portion of the process, the UE processes each of the sorted carrier and logical channel combinations in turn and assigns data from the corresponding logical channel j if $B_j$ for that logical channel is positive and there is still data available for logical channel j. At each step, $B_j$ (and $T_j$) is decremented by the amount of data granted to logical channel j.

Reference is now made to FIG. 18, which shows a result of the PBR allocation. In particular, FIG. 18 includes a running remaining grant size 1810 which shows the remaining grant size for each carrier, a running Bucket Contents field 1820 which is utilized for the bucket allocation of the PBR allocation process and a pending traffic field 1830 which shows the remaining amount of pending traffic for each logical carrier.

As seen in FIG. 18, at step 0 the initial values are those described above. In particular, carrier 1 has a grant size of 100 bytes, carrier 2 has a grant size of 200 bytes and carrier 3 has a grant size of 300 bytes.

Further, logical channel 1 has a bucket content size of 100 bytes, logical channel 2 has a bucket content size of 150 bytes and logical channel 3 has a bucket content size of 75 bytes.

Further, logical channel 1 has a total pending traffic size of 50 bytes, logical channel 2 has a total pending traffic size of 800 bytes and logical channel 3 has a total pending traffic size of 800 bytes.

The PBR allocation then utilizes the sorting positions as represented in FIG. 16 above and utilizes the first row, which has carrier 1 using logical channel 1. Thus, 50 bytes from logical channel 1 are applied to carrier 1. The grant of carrier 1 is thus reduced by 50 bytes and the bucket contents for logical channel 1 are reduced by 50 bytes and the pending traffic for logical channel 1 is reduced by 50 bytes to become 0 bytes. As appreciated, while the bucket contents were 100 bytes and the remaining grant size was 100 bytes, only 50 bytes of traffic existed on logical channel 1 and therefore only 50 bytes were allocated.

Moving to sorting position 2 of FIG. 16, carrier 2 is allocated for logical channel 1. However, since logical channel 1 has no further traffic pending, the allocation at sorting position 2 is ignored in the example of FIG. 18. Similarly, sorting position 3 from FIG. 16 shows an allocation of logical channel 1 to carrier 3. However, as logical channel 1 has no more data to send, this is also ignored in the step 3 of FIG. 18.

Sorting position 4 of FIG. 16 shows that carrier 2 is assigned logical channel 3. Based on this, logical channel 3 is examined and is shown to have 75 bytes as its bucket contents. Thus, a maximum of 75 bytes can be sent. Since the remaining grant size of carrier 2 is greater than 75 bytes and since the pending traffic for logical channel 3 is also greater than 75 bytes, 75 bytes is allocated to logical channel 3 on carrier 2. This reduces the grant size for carrier 2 from 200 bytes to 125 bytes, reduces the bucket contents for logical channel 3 to zero bytes and reduces the pending traffic for logical channel 3 from 800 bytes to 725 bytes.

The process then proceeds to sorting position 5 from FIG. 16 which allocates logical channel 2 to carrier 1. In this case, carrier 1 has a remaining grant size of 50 bytes, logical channel 2 has bucket contents of 150 bytes and logical channel 2 has pending traffic of 800 bytes. Thus, based on those three factors, 50 bytes can be allocated from logical channel 2 to carrier 1. As seen, this reduces the grant for carrier 1 from 50 bytes to 0 bytes, reduces the bucket contents of logical channel 2 to 100 bytes and reduces the pending traffic for logical channel 2 from 800 bytes to 750 bytes.

The process then proceeds to sorting position 6, which allocates logical channel 2 to carrier 2. Carrier 2 has 125 bytes remaining in its grant, while logical channel 2 has 100 bytes remaining in its bucket contents and 750 bytes remaining in pending traffic. Thus, based on bucket contents, 100 bytes are allocated from logical channel 2 to carrier 2, leaving a grant size of 25 bytes for carrier 2, bucket contents of 0 bytes for logical channel 2 and pending traffic of 650 bytes for logical channel 2.

Continuing through the sorting at sorting position 7, logical channel 2 is allocated to carrier 3. However, logical channel 2 has 0 bytes remaining in its bucket contents and thus, this sorting position is ignored. The process then proceeds to sorting position 8 from FIG. 16 and determines that logical channel 3 is allocated to carrier 1. However, carrier 1 has no further grant room left and therefore this is also ignored.

Following the PBR resource allocation procedural step, the remaining resources are then allocated to logical channels based on the logical channel priorities. In the example of FIG. 19, the same sorting order as that found in FIG. 16 above is used. The use of the sorting of FIG. 16 is however not meant to be limiting and other sorting orders could be used for the remaining resources processing.

In particular, in FIG. 19 the fields 1810, 1820 and 1830 from FIG. 18 are also represented. The initial values are those which are remaining after the PBR allocation step. Thus, in particular, carrier 1 has a grant of 0 bytes remaining, carrier 2 has a grant of 25 bytes remaining and carrier 3 has a grant of 300 bytes remaining. Further, logical channel 1 has bucket contents of 50 bytes remaining, logical channel 2 has bucket contents of 0 bytes remaining and logical channel 3 has bucket contents of 0 bytes remaining. However, as will be appreciated, for the remaining resource allocation, the bucket contents are not used and therefore do not matter.

Furthermore, pending traffic for each logical channel is illustrated in field 1830, which shows that logical channel 1 has 0 bytes remaining, logical channel 2 has 650 byes remaining and logical channel 3 has 725 bytes remaining.

Proceeding through the sorting order of FIG. 16, logical channel 1 is allocated to carrier 1. However, logical channel 1 has no pending traffic remaining and carrier 1 has no grant size remaining, therefore this is ignored.

Proceeding to sorting position 2, logical channel 1 is assigned to carrier 2. Again, logical channel 1 has no pending traffic and therefore this is ignored.

In sorting position 3, logical channel 1 is allocated to carrier 3. Again, logical channel 1 has no pending traffic and therefore this is ignored.

Proceeding to sorting position 4, logical channel 3 is allocated to carrier 2. Logical channel 3 has 725 bytes remaining and carrier 2 has 25 bytes remaining in its grant. Therefore, 25 bytes are allocated from logical channel 3 to carrier 2 leaving 0 bytes in the remaining grant size for carrier 2 and 700 bytes of pending traffic for logical channel 3.

In the 5$^{th}$ sorting position of FIG. 16, logical channel 2 is assigned to carrier 1. However, carrier 1 has no remaining grant room and this is therefore ignored.

In the sorting position 6 of FIG. 16, logical channel 2 is allocated to carrier 2. Carrier 2 has, however, no further grant room and therefore this is ignored.

In sorting position 7, logical channel 2 is allocated to carrier 3. Logical channel 2 has 650 bytes remaining and carrier 3 has 300 bytes remaining in its grant. Therefore 300 bytes are allocated from logical channel 2 to carrier 3 leaving a grant size of 0 bytes for carrier 3 and 350 bytes of pending traffic for logical channel 2.

The process then proceeds to sorting position 8 in which logical channel 3 is allocated to carrier 1. Carrier 1 has no bytes remaining in its grant and therefore this is ignored.

Based on the above, the complete grant is utilized for each of the three carriers. The final resource allocation for the uplink grant corresponding to each carrier is shown below with regard to Table 6. This shows that logical channel 1 has 50 bytes on carrier 1, logical channel 2 has 50 bytes on carrier 1, 100 bytes on carrier 2 and 300 bytes on carrier 3 and logical channel 3 has 100 bytes on carrier 2.

TABLE 6

Final allocations

| | Carrier 1 | Carrier 2 | Carrier 3 | Total (per LC) |
|---|---|---|---|---|
| Logical Channel 1 | 50 bytes | | | 50 bytes |
| Logical Channel 2 | 50 bytes | 100 bytes | 300 bytes | 450 bytes |
| Logical Channel 3 | | 100 bytes | | 100 bytes |
| Total (per carrier) | 100 bytes | 200 bytes | 300 bytes | |

As will be appreciated by those skilled in the art, FIG. 16 illustrates instances where different carriers or logical channel combinations have the same priority. Hence, some sort of "tie-breaking" rule must be utilized when sorting all possible combinations into order by priority. In the example of FIG. 16, the sorting was merely done by carrier and logical channel index. Other alternative implementations exist. These could include sorting by the grant size of a carrier where the carrier with the largest or smallest grant size is sorted first.

Carriers that have forbidden logical channels may be sorted first in some instances, which will ensure that these grants are utilized before grants from other carriers to ensure that the former grants are not left under-utilized after the resources have been allocated to the other carriers.

Semi-static configuration is possible in configuring a preferred order for carriers and logical channels for breaking ties. Alternatively, random or pseudo-random tie-breaks can occur.

Further, while the same sorting order of FIG. 16 was utilized for both the PBR allocation and the remaining resource allocation examples of FIG. 18 and FIG. 19, this does not necessarily need to be the case. Different sorting orders can be used for each of blocks 1720 and 1730 of FIG. 17. Thus, a first sorting order can be utilized for the PBR allocation process and a second sorting order can be utilized for the remaining resources allocation process. This may be true especially when some carriers or logical channel combinations have the same priority and different tie-breaking rules are used for each of the two procedures. For example, tie-breaking rules that may apply specifically to PBR allocation procedural step include:

In ties between different carriers but the same logical channel j, choose the grant with the least remaining space, but whose remaining space is larger than or equal to $B_j$. If no remaining grant size is larger than or equal to $B_j$, then choose the grant with the largest remaining size.

When some logical channels (with pending traffic) are forbidden from transmitting on some carriers (that currently have uplink grants), then use the following algorithm to break ties.

Let $T_{kj}=\min(B_j)$, amount of queued traffic for logical channel j) for each carrier k that possesses an uplink grant. $T_{kj}=0$ if logical channel j is forbidden from transmitting on carrier k.

Let $S_k=\text{sum}(T_{kj})$ over all logical channels j.

In ties between different carriers, choose the carrier k with the smallest $S_k$, since that carrier's grant may be the most difficult to fill (since fewer logical channels are allowed to transmit on that carrier).

Tie-breaking rules that may apply specifically to the remaining resource allocation procedural step may include:

In ties between different carriers but the same logical channel, choose the grant that already has a resource assignment (from the PBR allocation procedural step) for the current logical channel, since this will minimize header overhead.

Figure 20:
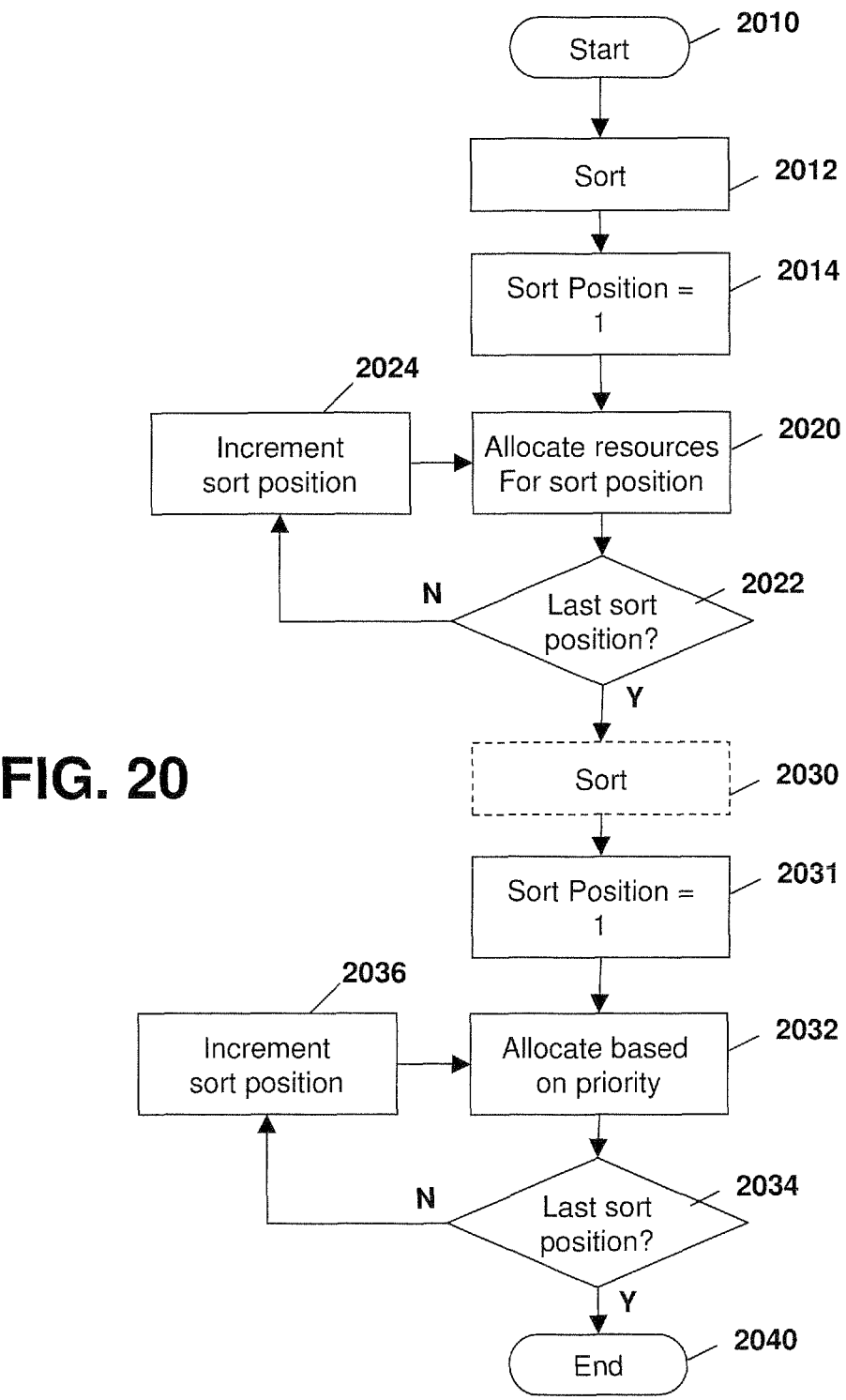
FIG. 20 is a flow diagram showing the allocation of resources based on the PBR and remaining resources steps.

The above procedure may be shown with a process diagram of FIG. 20. In particular, the process diagram of FIG. 20 starts at block 2010 and proceeds to block 2012 in which a sort is done based on carrier and logical channel priority information as indicated above with regard to FIG. 16 and also with regard to the embodiments of the present disclosure. Note that FIG. 20 only shows an example of one embodiment, and other examples are possible.

The process then proceeds to block 2014 in which the sorting position is set to position 1.

The process then proceeds to block 2020 in which resources are allocated for the particular sorting position based on grant, bucket and pending traffic information.

The process proceeds to block 2022 in which a check is made to see whether the sorting position currently allocated is the last sorting position. If no, then the process proceeds to block 2024 in which the sorting position is incremented and the process then proceeds back to block 2020 in which the resources are allocated for the new sorting position. The allocation of block 2020 was shown above with regard to FIG. 18.

From block 2022, if the last sorting position has been reached, the process proceeds to block 2030. In block 2030 optionally another sort is performed. This is done in cases where the sorting order may be different for the remaining resource allocation.

The process then proceeds to block 2031 in which the sort position is set to position one.

The process then proceeds to block 2032 in which resources are allocated based on logical channel priorities. Such allocation is shown for example with regard to FIG. 19 above.

From block 2032, the process proceeds to block 2034 in which a check is made to determine whether the last sorting position has been reached.

From block 2034, if the last sorting position has not been reached, the process proceeds to block 2036 in which the sorting position is incremented and the process then proceeds to block 2032 to allocate the resources for the new sorting position.

From block 2034, if the last position has been reached, the process proceeds to block 2040 and ends.

Reserve and Remove

A variant of the above may be implemented in certain situations. The algorithm described herein with respect to the variant takes note of the following considerations. Where possible, each logical channel should transmit on the highest priority carrier for that logical channel. Further, some logical channels may have equal priority settings on multiple carriers. In such cases, it may be desirable to select the carrier assignment for those logical channels such that the carrier assignments for other logical channels are optimized for their logical channel priority settings.

Basically, as resource assignments are made during the PBR procedural step, any logical channel that has equal priority settings on multiple carriers will make "a reservation" on those carriers for the appropriate amount of resources such as the bucket contents for the particular logical channel or the remaining resources that are available on those carriers, whichever is less. As further resource assignments are made for other logical channels, a prior reservation for a higher priority logical channel will be removed or canceled if it collides with the resource assignment for the current logical channel. When one or more reservations for a particular logical channel is removed or an existing reservation size is reduced, if the total size of the remaining reserved resources (possibly across multiple reservations or different carriers) for that logical channel equals the total required PBR resource size for that logical channel, then those remaining reservations will be converted into resource allocations for that logical channel.

The alternative is best illustrated through an example. Similar grants, bucket contents and traffic queue sizes as those illustrated in FIG. 18 above are used herein. As well, the same logical channel priorities are used for each uplink carrier as those listed in FIG. 16 after sorting. Reference is now made to FIG. 21 which shows the result of the PBR allocation step when applied to a reserve and remove process.

In FIG. 21, when a current logical channel has the same priority for multiple carriers, a reservation is made rather than an assignment. Thus, in accordance with FIG. 21, the initial values are set similarly to those of FIG. 18 and the sorted priorities are then processed. In sorting position 1, 2 and 3, logical channel 1 has the same priority on the three different carriers. Therefore, steps 1, 2 and 3 of FIG. 21 reserve the 50 bytes corresponding to the pending traffic amount on each of carriers 1, 2 and 3 respectively. As seen, the reservation causes a decrement of the remaining grant size from the various carriers in steps 1, 2 and 3 of FIG. 21.

The next sorting position is sorting position 4, in which logical channel 3 is allocated to carrier 2 utilizing a priority of 2. Since there are no other priority 2 allocations, this is an assignment rather than a reservation. The assignment changes the remaining grant size for carrier 2 from 150 to 75 bytes, reduces the bucket contents for logical channel 3 to 0 bytes and reduces the pending traffic for logical channel 3 to 725 bytes.

In sorting position 5, logical channel 2 is allocated to carrier 1. Logical channel 2 has bucket contents of 150 bytes and 800 bytes of pending traffic. This would therefore fill the initial grant for carrier 1. Thus, as shown in Step 5A, the reservation of the 50 bytes on carrier 1 is cancelled, and as shown by Step 5B, carrier 1 is assigned 100 bytes for logical channel 2. This leaves a grant size of 0 bytes remaining on carrier 1, bucket contents of 50 bytes for logical channel 2 and 100 bytes of pending traffic for logical channel 2.

At sorting position 6, logical channel 2 is assigned to carrier 2, which has a remaining grant size of 75 bytes. Logical channel 2 has 50 bytes of bucket contents remaining. Therefore, 50 bytes are allocated from logical channel 2 to carrier 2, leaving a grant size of 25 bytes on carrier 2.

Sorting position 7 assigns logical channel 2 to carrier 3. However, logical channel 2 has no bucket contents remaining and therefore, this is ignored.

Sorting position 8 assigns logical channel 3 to carrier 1. However, carrier 1 has no remaining grant room and therefore this step is also ignored.

After the process of FIG. 21 is completed, logical channel 1 still has 50 bytes that are reserved on carrier 2 and carrier 3, whereas logical channel 2 has 100 bytes on carrier 1 assigned and 50 bytes on carrier 2 assigned. Logical channel 3 has 75 bytes assigned on carrier 2. This is illustrated with regard to Table 7 below.

TABLE 7

| Logical Channel | | Carrier 1 | Carrier 2 | Carrier 3 |
|---|---|---|---|---|
| 1 | Reserved | | 50 bytes | 50 bytes |
|   | Assigned | | | |
| 2 | Reserved | | | |
|   | Assigned | 100 bytes | 50 bytes | |
| 3 | Reserved | | | |
|   | Assigned | | 75 bytes | |

Moving from the PBR allocation step to the remaining resources allocation step, reference is now made to FIG. 22. In FIG. 22, the sorting order of FIG. 16 is used.

The first three positions of the sorting order assign logical channel 1 to carriers 1, 2 and 3 respectively. Since logical channel 1 has no further pending data these steps are ignored.

In sorting position 4, logical channel 3 is assigned to carrier 2. Since carrier 2 has a grant size of 25 bytes remaining plus 50 reserved bytes, the example of FIG. 22 cancels the reservation of 50 bytes for logical channel 1 on carrier 2 which causes the reservation of 50 bytes for logical channel 1 on carrier 3 to become an assignment of those bytes.

Also, the 50 bytes from carrier 2 get added back to the 25 bytes remaining on carrier 2 leaving 75 bytes which are then assigned to logical carrier 3, leaving a remaining grant of 0 bytes for carrier 2 and remaining traffic of 650 bytes for logical channel 3.

Sorting position 5 allocates logical channel 2 to carrier 1. However, carrier 1 has no remaining grant room and this step is therefore ignored.

Sorting position 6 allocates logical channel 2 to carrier 2. However, carrier 2 has no remaining grant room and therefore this is also ignored.

Sorting position 7 allocates logical channel 2 to carrier 3. Carrier 3 has 250 bytes of grant remaining and therefore this is assigned to logical channel 2. Logical channel 2 therefore has 450 bytes of pending traffic remaining and carrier 3 has 0 bytes remaining in its grant.

Sorting position 8 then assigns logical channel 3 to carrier 1. However, carrier 1 has no remaining grant room and this step is ignored.

Reference is made to Table 8 below, which shows the final resource allocations for the uplink grant corresponding to each carrier. Paired with Table 6 above, it can be seen that a different set of final resource allocations exist between the two tables. In particular, the traffic from logical channel 1 was assigned to an "optimal" carrier in terms of freeing up space on the other carriers for the other logical channels and logical channel 3 received a greater total allocation while logical channel 2 received a lower total allocation. This results in a set of allocations that may be considered more "fair" from a viewpoint of logical channel 3.

TABLE 8

| Final Allocation | | | | |
|---|---|---|---|---|
| | Carrier 1 | Carrier 2 | Carrier 3 | Total (per LC) |
| Logical Channel 1 | | | 50 bytes | 50 bytes |
| Logical Channel 2 | 100 bytes | 50 bytes | 250 bytes | 400 bytes |
| Logical Channel 3 | | 150 bytes | | 150 bytes |
| Total (per carrier) | 100 bytes | 200 bytes | 300 bytes | |

MAC Control Elements

In E-UTRA Release 8 there are MAC control elements (CE) that may be transmitted on the uplink by the UE in order to communicate control signaling to the eNB. MAC control elements are short signaling messages that are included within a MAC PDU that is being transmitted on the uplink to the eNB.

A Cell Radio Network Temporary Identifier (C-RNTI) MAC control element is used by a UE that already possesses a C-RNTI and which is performing a random access procedure in order to obtain uplink synchronization with the eNB. If a UE does not already posses a C-RNTI, (such as when transitioning from RRC_IDLE to RRC_CONNECTED to establish a connection with an eNB) then the random access procedure is used to obtain uplink synchronization with an eNB and to obtain a C-RNTI from the eNB. However, a UE that is already in an RRC_CONNECTED mode and which already possesses a C-RNTI may lose uplink synchronization with the eNB and thus need to perform a random access procedure in order to regain uplink synchronization. As part of this procedure, the UE includes its existing C-RNTI within a C-RNTI MAC control element so that the eNB can determine which UE is performing a particular random access. C-RNTI MAC control elements may also be used following a handover when a UE must obtain uplink synchronization in a new cell.

A Buffer Status Report (BSR) MAC control element is used to communicate the amount of pending uplink data per logical channel group to the eNB. The uplink scheduler at the eNB can then use this information to assign uplink transmission resources to UEs that have data to transmit. Each logical channel may be optionally assigned to a logical channel group for the purposes of generating a BSR. BSRs may be triggered by events such as a certain time period passing since the previous BSR was transmitted, new uplink data arriving at the UE, among others.

Padding BSRs may also be added to MAC PDUs that require padding in order to completely fill the available space of the MAC PDU. In this case, a padding BSR is included to make use of the additional space that is available and which otherwise would be wasted as padding. A maximum of only one BSR can be included in any MAC PDU.

A Power Headroom Report (PHR) MAC control element is used to communicate the available power headroom on an uplink carrier to the eNB. Essentially, this tells the eNB how much extra transmission power is available at the UE in case the eNB wishes to increase the transmission power of the UE through closed loop power control signaling or to assign additional uplink transmission resources to the UE. Such additional uplink transmission resources may include physical resource blocks or modulation and code rate setting.

It is possible further MAC control elements may be added in future releases of long term evolution or other network standards.

Transmission of the C-RNTI MAC control element is part of a random access procedure. A UE configured with multiple uplink carriers may need to perform this procedure in order to regain uplink synchronization or upon receiving an order to do so from the eNB via the PDCCH. In one embodiment, a C-RNTI MAC control element should be transmitted on the same uplink carrier as on which the initial random access preamble was transmitted or on the uplink carrier that the eNB has signaled or on the pre-configured uplink carrier. Hence, in the case of a UE receiving simultaneous uplink grants on multiple uplink carriers, it is clear within which MAC PDU the C-RNTI MAC control element should be included.

The other MAC control elements are a different case. Uplink MAC control element transmission on a multi-carrier situation could be configured to follow various options.

A. MAC Control Elements are Only Transmitted on One Uplink Carrier

MAC control elements in one embodiment may be only transmitted on a single uplink carrier. In one embodiment, the uplink anchor or reference or designated carrier could be utilized in this case. In another embodiment, the uplink carrier to use is signaled by the eNB. If a particular MAC control element is triggered, that MAC control element is not sent until an uplink grant is received for the particular carrier, even if uplink grants for other carriers are received in the meantime.

B. MAC CE Preferably Carried on a Particular Carrier but May be Sent on Other Carriers.

In an alternative embodiment, the MAC control element prefers to be carried on a particular uplink carrier but may be sent on a different uplink carrier if that is the only uplink grant available when the MAC control element has been triggered. For example, assuming that a buffer status report has been triggered, if two uplink grants are received in that subframe, one for the reference carrier and one for the non-reference carrier, then the BSR MAC control element will only be included for the MAC PDU for the uplink reference carrier. However, if only uplink grants for non-reference carriers are received in that subframe (and no uplink grant for the reference carrier), the BSR MAC control element will be included in the MAC PDU for a non-reference uplink carrier.

C. Avoiding Uplink SPS

MAC control elements in this embodiment avoid being carried within a MAC PDU originating from an uplink SPS configuration if non-SPS uplink grants on other carriers are available. This may avoid possible fragmentation of voice packets, for example.

D. Different Uplink Carriers to Obtain Diversity Gain

The chosen uplink carrier to transmit MAC control elements can be different at each transmission opportunity in order to obtain a diversity gain. To select a different carrier based on current timing, the current system frame number (SFN) and subframe offset within the current 10 ms radio frame, a MAC control element counter or a pseudo-random sequence could be used. For example, the UE would transmit MAC control elements on carrier k, where k=[(SFN*10)+ subframe number] modulo (number of configured carriers).

If, in a particular subframe, carrier k is the chosen carrier to carry a MAC control element but there is no uplink grant received for that carrier, the UE can send the MAC control element on a non-chosen carrier that has an uplink grant.

E. MAC CE Included in all Uplink Carriers

MAC control elements when triggered are included in all uplink carriers that currently have an uplink grant available. This results in greater overhead, since MAC control elements may be duplicated among multiple MAC PDUs. However, this approach may also result in greater signaling robustness and reduced signaling latency since there is a greater probability of at least one of the copies of the MAC control element being successfully received at the eNB on the first transmission attempt.

F. Any Carrier

In a further embodiment, the MAC control element when triggered can be sent on any of the uplink carriers that currently have available uplink grants.

G. Carrier Specific MAC Control Elements

Carrier specific MAC control elements such as a PHR per carrier can be transmitted on the same carrier. For example, the PHR of carrier 1 is transmitted on carrier 1 when an uplink grant for carrier 1 is received.

H. Virtual Carriers

The eNB scheduling entity for different carriers can be different when one or more uplink virtual carriers are supported. In this case, some MAC control elements may need to be transmitted to the eNB scheduling a particular uplink carrier to help with the scheduling. Carrier common MAC control elements such as BSR can be transmitted to both eNBs and carrier specific MAC control elements (example PHR) can be transmitted to the eNB which "owns" the corresponding carrier. The serving eNB can provide information about on which carrier the particular MAC control elements are to be transmitted.

Alternatively, if the UE is aware of which eNB schedules a particular uplink carrier, the UE can transmit the appropriate MAC control elements to that eNB. As an example, assume that there are five carriers where four labeled CC1, CC2, CC3 and CC4 are transmitted to eNB 1 and the fifth is labeled CC5 and is transmitted to eNB 2. In this example, BSR MAC control element could be transmitted to eNB 1, eNB 2, or both, while the PHR and C-RNTI MAC control elements for CC1 to CC4 would be transmitted to eNB 1 while the PHR and C-RNTI MAC control elements for CC5 would be transmitted to eNB 2. If BSR can be defined per carrier, it should be possible to transmit the appropriate BSR MAC control elements to each eNB depending on the particular carrier in question.

To transmit MAC control elements corresponding to CC1-CC4 to eNB 1, one of the previously listed embodiments may be applied.

As will be appreciated by those skilled in the art, the same approach for all MAC control elements could be used, or individually separate approaches from the above could be used for each BSR and PHR MAC control element. For example, approach B could be used for BSR MAC control elements while approach D could be used for PHR MAC control elements.

The solutions above also depend on whether or not the Release 8 format for the control element is maintained or whether new enhanced control element formats are adopted for multi-carrier UEs. For example, the PHR MAC control element may depend on which release the control element is for. If the Release 8 format is kept, then the PHR MAC control element for a particular uplink carrier can only be transmitted on that carrier, so that the eNB can associate the corresponding power headroom report with the correct uplink carrier. However, if a new Release 10 format is adopted that consolidates power headroom information for multiple uplink carriers into a single message or MAC control element, then the choice of which uplink carrier to use for sending the PHR MAC control element may become more flexible.

Buffer status reports are generally uplink carrier agnostic since BSRs report the amount of pending data per logical channel group. A logical channel group may include one or multiple logical channels. When a new logical channel is configured, it is optionally assigned to a logical channel group. One possible extension to the carrier aggregation scenario would allow different logical channel group assignments for different uplink carriers. BSR MAC control elements transmitted on different uplink carriers could therefore have different values and could be used by the eNB to deduce additional information about the pending uplink data at the pending UE. An example of this is shown below with regard to Table 9, where logical channel groups 1 and 2 contain different logical channels, depending upon which uplink carrier is being considered as a reference.

TABLE 9

| Logical Channel Group | Uplink Carrier 1 | Uplink Carrier 2 |
|---|---|---|
| 1 | 1, 2 | 1, 2, 3 |
| 2 | 3, 4 | 4 |

Assuming that buffer status reports are constructed based on the example amounts of pending data shown below with regard to Table 10, a BSR transmitted on carrier 1 would indicate that 100+200=300 bytes are pending for LCG 0 and 300+400=700 bytes are pending for LCG 1. Conversely, a BSR transmitted on carrier 2 would indicate that 100+200+300=600 bytes are pending for LCG 0 and 400 bytes are pending for LCG 1. If desired the eNB could use this extra BSR information to deduce the actual amount of pending data on a per logical channel basis rather then on a per logical group basis.

TABLE 10

| Logical Channel | Amount of pending data (bytes) |
|---|---|
| 1 | 100 |
| 2 | 200 |
| 3 | 300 |
| 4 | 400 |

Similarly, the LogicalChannelConfig information element of Section 6.3.2 of TS 36.331 optionally may assign a logical channel to a logical channel group. Consequently, for example, of eight logical channels with two uplink carriers, the logical channel to logical channel group assignments given in Table 11 below could be used. This would allow the UE to report the amount of pending data on a per logical channel basis, with any BSRs transmitted on carrier 1 giving the individual traffic queue sizes for logical channel sizes 1 through 4 and any BSRs transmitted on carrier 2 giving the individual traffic queue sizes for logical channels 5 through 8.

TABLE 11

| Logical Channel Group | Uplink Carrier 1 | Uplink Carrier 2 |
|---|---|---|
| 0 | 1 | 5 |
| 1 | 2 | 6 |
| 2 | 3 | 7 |
| 3 | 4 | 8 |

The above can be implemented on any user equipment on the receiving side and any network element such as an evolved Node B on the sending side. On the sending side, the network element will include a communications subsystem to send the information concerning transport layers utilized.

Figure 23:
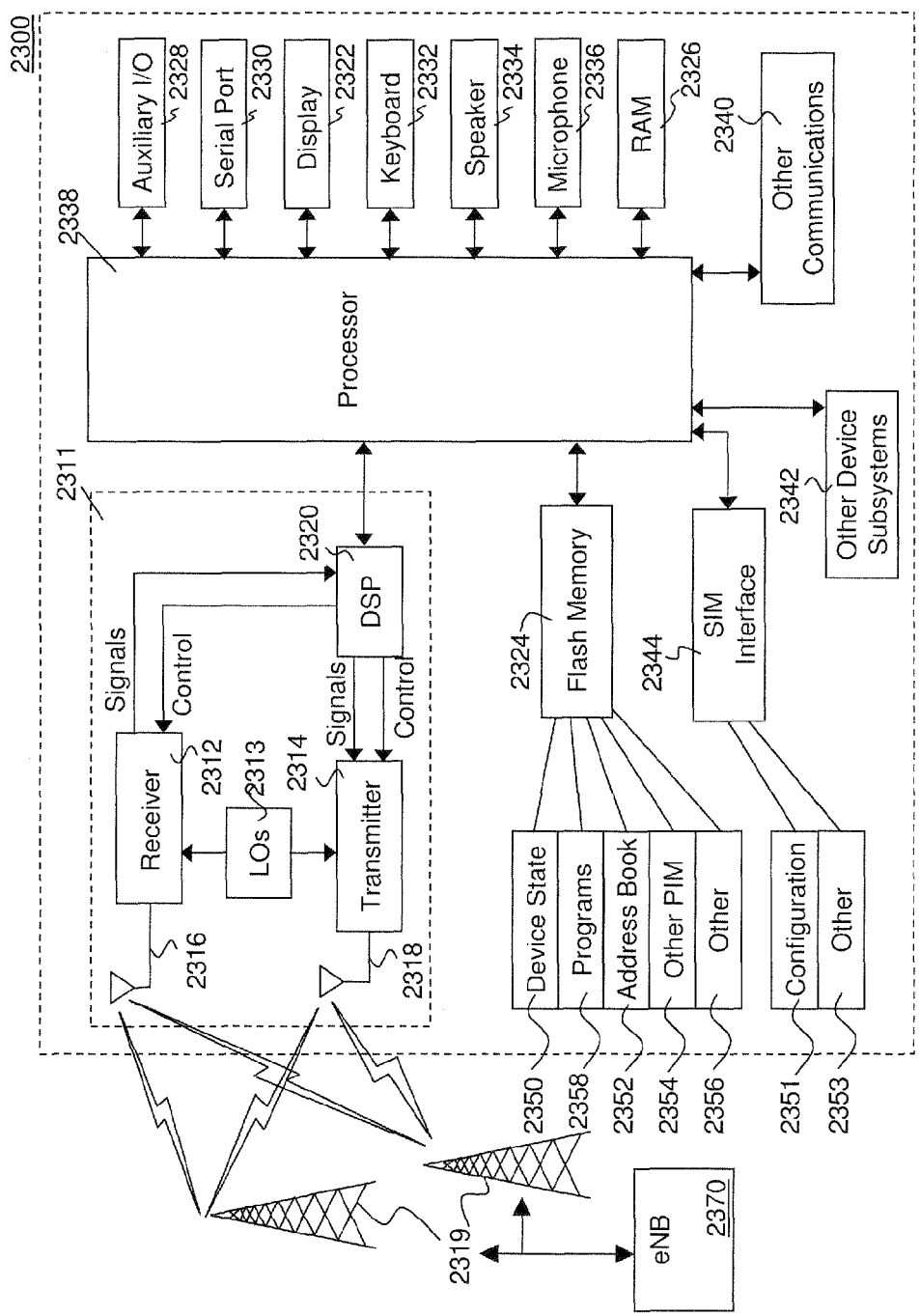
FIG. 23 is a block diagram of an exemplary user equipment.

For the UE side, FIG. 23 is a block diagram illustrating a UE capable of being used with various embodiments of the apparatus and method of the present application. UE 2300 is typically a two-way wireless communication device having voice, data or both voice and data communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 2300 is enabled for two-way communication, it will incorporate a communication subsystem 2311, including both a receiver 2312 and a transmitter 2314, as well as associated components such as one or more, embedded or internal, antenna elements 2316 and 2318, local oscillators (LOs) 2313, and a processing module such as a digital signal processor (DSP) 2320. As will be apparent to those skilled in the field of communications, the particular design of the communication subsystem 2311 will be dependent upon the communication network in which the device is intended to operate.

Network access requirements will also vary depending upon the type of network 2319. An LTE UE may require a subscriber identity module (SIM) card in order to operate on the LTE or LTE-A network. The SIM interface 2344 is normally similar to a card-slot into which a SIM card can be inserted and ejected like a diskette or PCMCIA card. The SIM card may hold key configuration 2351, and other information 2353 such as identification, and subscriber related information.

When required network registration or activation procedures have been completed, UE 2300 may send and receive communication signals over the network 2319. As illustrated in FIG. 23, network 2319 can consist of multiple antennas communicating with the UE. These antennas are in turn connected to a network element such as eNB 2370. The network element, for example eNB 2370, includes a processor and communications subsystem (not shown) for providing uplink grants and for processing network side actions in accordance with the methods described herein.

Signals received by antenna 2316 through communication network 2319 are input to receiver 2312, which may perform such common receiver functions as signal amplification, frequency down conversion, filtering, channel selection and the like, and in the example system shown in FIG. 23, analog to digital (A/D) conversion. ND conversion of a received signal allows more complex communication functions such as demodulation and decoding to be performed in the DSP 2320. In a similar manner, signals to be transmitted are processed, including modulation and encoding for example, by DSP 2320 and input to transmitter 2314 for digital to analog conversion, frequency up conversion, filtering, amplification and transmission over the communication network 2319 via antenna 2318. DSP 2320 not only processes communication signals, but also provides for receiver and transmitter control. For example, the gains applied to communication signals in receiver 2312 and transmitter 2314 may be adaptively controlled through automatic gain control algorithms implemented in DSP 2320.

UE 2300 typically includes a processor 2338 which controls the overall operation of the device. Communication functions, including data and voice communications, are performed through communication subsystem 2311. Processor 2338 also interacts with further device subsystems such as the display 2322, flash memory 2324, random access memory (RAM) 2326, auxiliary input/output (I/O) subsystems 2328, serial port 2330, one or more keyboards or keypads 2332, speaker 2334, microphone 2336, other communications subsystem 2340 such as a short-range communications subsystem and any other device subsystems generally designated as 2342. Serial port 2330 could include a USB port or other port known to those in the art.

Some of the subsystems shown in FIG. 23 perform communication-related functions, whereas other subsystems may provide "resident" or on-device functions. Notably, some subsystems, such as keyboard 2332 and display 2322, for example, may be used for both communication-related functions, such as entering a text message for transmission over a communication network, and device-resident functions such as a calculator or task list.

Operating system software used by the processor 2338 is generally stored in a persistent store such as flash memory 2324, which may instead be a read-only memory (ROM) or similar storage element (not shown). Those skilled in the art will appreciate that the operating system, specific device applications, or parts thereof, may be temporarily loaded into a volatile memory such as RAM 2326. Received communication signals may also be stored in RAM 2326.

As shown, flash memory 2324 can be segregated into different areas for both computer programs 2358 and program data storage 2350, 2352, 2354 and 2356. These different storage types indicate that each program can allocate a portion of flash memory 2324 for their own data storage requirements. Processor 2338, in addition to its operating system functions, may enable execution of software applications on the UE. A predetermined set of applications that control basic operations, including data and voice communication applications for example, may be installed on UE 2300 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 2319. In one embodiment, the PIM data items are seamlessly integrated, synchronized and updated, via the wireless network 2319, with the UE user's corresponding data items stored or associated with a host computer system. Further applications may also be loaded onto the UE 2300 through the network 2319, an auxiliary I/O subsystem 2328, serial port 2330, short-range communications subsystem 2340 or any other suitable subsystem 2342, and installed by a user in the RAM 2326 or a non-volatile store (not shown) for execution by the processor 2338. Such flexibility in application installation increases the functionality of the device and may provide enhanced on-device functions, communication-related functions, or both. For example, secure communication applications may enable electronic commerce functions and other such financial transactions to be performed using the UE 2300.

In a data communication mode, a received signal such as a text message or web page download will be processed by the communication subsystem 2311 and input to the processor 2338, which may then further process the received signal for element attributes for output to the display 2322, or alternatively to an auxiliary I/O device 2328.

A user of UE 2300 may also compose data items such as email messages, for example, using the keyboard 2332, which may be a complete alphanumeric keyboard or telephone-type keypad, in conjunction with the display 2322 and possibly an auxiliary I/O device 2328. Such composed items may then be transmitted over a communication network through the communication subsystem 2311.

For voice communications, overall operation of UE 2300 is similar, except that received signals would typically be output to a speaker 2334 and signals for transmission would be generated by a microphone 2336. Alternative voice or audio I/O subsystems, such as a voice message recording subsystem, may also be implemented on UE 2300. Although voice or audio signal output can be accomplished primarily through the speaker 2334, display 2322 may also be used to provide an indication of the identity of a calling party, the duration of a voice call, or other voice call related information, for example.

Serial port 2330 in FIG. 23 would normally be implemented in a personal digital assistant (PDA)-type UE for which synchronization with a user's desktop computer (not shown) may be desirable, but is an optional device component. Such a port 2330 would enable a user to set preferences through an external device or software application and would extend the capabilities of UE 2300 by providing for information or software downloads to UE 2300 other than through a wireless communication network. The alternate download path may for example be used to load an encryption key onto the device through a direct and thus reliable and trusted connection to thereby enable secure device communication. As will be appreciated by those skilled in the art, serial port 2330 can further be used to connect the UE to a computer to act as a modem.

Other communications subsystems 2340, such as a short-range communications subsystem, is a further component which may provide for communication between UE 2300 and different systems or devices, which need not necessarily be similar devices. For example, the subsystem 2340 may include an infrared device and associated circuits and components or a Bluetooth™ communication module to provide for communication with similarly enabled systems and devices. Subsystem 2340 may also be used for WiFi or WiMAX communications.

Communications subsystem 2311 may be designed to transmit or receive on multiple carriers for some networks. Processor 2338, DSP 2320, or other processing element could be used by UE 2300 to allocate traffic to uplink channels, to prioritize logical channels with regards to uplink carriers, allocate carriers for MAC control elements, or perform the methods as described herein.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for logical channel prioritization at a user equipment in a system supporting multiple uplink carriers comprising:
  receiving at the user equipment multiple uplink carrier grants;
  receiving at the user equipment multiple sets of logical channel priorities, each set of logical channel priorities being associated on a per uplink carrier basis with one of the multiple uplink carriers, and each set of logical channel priorities defining a priority order for the logical channels at the user equipment;

choosing an uplink carrier from the multiple uplink carrier grants;
selecting from the multiple sets of logical channel priorities a selected set of logical channel priorities corresponding to the chosen uplink carrier; and
applying the selected set of logical channel priorities to the logical channels to allocate logical channel traffic for the chosen uplink carrier.

2. The method of claim 1, wherein the logical channel priorities are further assigned on a per carrier group basis.

3. The method of claim 1, wherein the logical channel priorities include a setting preventing a logical channel from transmitting on an uplink carrier.

4. The method of claim 1, wherein the applying applies a potentially different priority for each carrier to each logical channel.

5. The method of claim 1, wherein the applied logical channel priorities are applicable uniformly to all uplink carriers.

6. The method of claim 1, wherein the receiving is performed through radio resource control signaling.

7. The method of claim 1, wherein the logical channel priorities are grouped into sets.

8. The method of claim 7, wherein the sets are configured utilizing radio resource control signaling.

9. The method of claim 7, wherein the receiving is performed utilizing medium access control ("MAC") control elements.

10. The method of claim 9, wherein a field value in a control element is associated with a carrier and a logical channel priority set.

11. The method of claim 7, wherein the receiving is performed utilizing downlink control information.

12. The method of claim 11, wherein the downlink control information includes a field value corresponding with a logical channel priority set to be used for a carrier associated with the downlink control information.

13. The method of claim 1, wherein the applying ensures at least one carrier is available to a logical channel for uplink transmission.

14. A user equipment comprising:
a communications subsystem; and
a processor,
the communications subsystem and processor cooperating to:
  receive at the user equipment multiple uplink carrier grants;
  receive multiple sets of logical channel priorities for multiple uplink carriers at the user equipment, each set of said logical channel priorities being associated on a per uplink carrier basis for with one of the multiple uplink carriers and each set of logical channel priorities defining a priority order for respective logical channels at the user equipment;
  choose an uplink carrier from the multiple uplink carrier grants; and
  apply the set of logical channel priorities selected from multiple sets of logical channel priorities, corresponding to the chosen uplink carrier, to the logical channels to allocate logical channel traffic for the chosen uplink carrier.

15. A method for constructing an uplink medium access control protocol data unit at a user equipment in a multiple uplink carrier system comprising:
  receiving multiple uplink grants;
  sorting the multiple uplink grants from a highest priority grant to a lowest priority grant; and
  applying a logical channel prioritization scheme sequentially for the grants using logical channel priorities to allocate logical channel traffic to the medium access control protocol data unit,
  wherein when carriers having a same relative priority, the sorting utilizing tie breaking rules to decide which of the uplink grants for the carriers has higher priority,
  wherein the tie breaking rules are selected from the group consisting of:
    assigning said higher priority for larger uplink grants than smaller uplink grants;
    assigning said higher priority for smaller uplink grants than larger uplink grants; and
    pseudo-randomly determining which of said uplink grants has a higher priority.

16. A user equipment comprising:
a communications subsystem; and
a processor,
the communications subsystem and processor cooperating to:
  receive multiple uplink grants;
  sort the multiple uplink grants from a highest priority grant to a lowest priority grant; and
  apply a logical channel prioritization scheme sequentially for the grants using logical channel priorities to allocate logical channel traffic to the medium access control protocol data unit;
  wherein when carriers having a same relative priority, the sorting utilizing tie breaking rules to decide which of the uplink grants for the carriers has higher priority,
  wherein the tie breaking rules are selected from the group consisting of:
    assigning said higher priority for larger uplink grants than smaller uplink grants;
    assigning said higher priority for smaller uplink grants than larger uplink grants; and
    pseudo-randomly determining which of said uplink grants has a higher priority.

17. A method for constructing an uplink medium access control protocol data unit at a user equipment in a multiple uplink carrier system comprising:
  sorting possible logical channel and carrier pairings based on logical channel priorities;
  utilizing a prioritized bit rate process to allocate logical channel traffic in an order determined by the sorting; and
  performing a remaining resources process to allocate logical channel traffic based on a priority order.

18. The method of claim 17, wherein the sorting includes applying tie-breaking rules to sort logical channel and carrier pairings having the same priority.

19. The method of claim 18, wherein the tie breaking rules are selected from the group consisting of:
  prioritizing a carrier with a larger grant;
  prioritizing carriers that have forbidden logical channels;
  semi-statically configuring carrier order; and
  breaking ties randomly.

20. The method of claim 17, wherein the prioritized bit rate process utilizes a token bucket scheduler to determine carrier and logical channel allocation.

21. The method of claim 17, comprising an arranging step prior to the performing of the remaining resources process when carriers and logical channel pairings have the same priority, wherein the arranging utilizes different tie breaking rules in the sorting and utilizing steps.

22. The method of claim 21, wherein the tie breaking rules for the sorting are selected from the group consisting of:
prioritizing a carrier whose grant has less remaining space after allocation on a logical channel than grants on other carriers but whose remaining space after allocation is greater than a bucket content for the logical channel; and
prioritizing a carrier whose potential traffic is the smallest for all logical channels not forbidden from transmitting.

23. The method of claim 21, wherein the tie breaking rules include choosing a grant that already has a resource assignment for a current logical channel.

24. The method of claim 17, wherein the utilizing further comprises reserving resources on a plurality of carriers having the same priority for a logical channel until other logical channels have filled grants for all but one of the plurality of carriers.

25. A user equipment comprising:
a communications subsystem; and
a processor,
the communications subsystem and processor cooperating to:
sort possible logical channel and carrier pairings based on logical channel priorities;
utilize a prioritized bit rate process to allocate logical channel traffic in an order determined by the sorting; and
perform a remaining resources process to allocate logical channel traffic based on a priority order.

26. A method for transmitting an uplink medium access control ("MAC") control element from user equipment in a multiple uplink carrier system, comprising:
choosing at least one carrier from the multiple uplink carriers to transmit the MAC control element at the user equipment; and
transmitting the MAC control element on the chosen uplink carrier, wherein choosing at least one carrier includes utilizing a carrier subset selected from the group consisting of:
a single reference carrier for transmitting the MAC control element;
a reference carrier for transmitting the MAC control element if a grant for the reference carrier is received in a subframe, and utilizes another carrier having a grant in the subframe otherwise;
a carrier that is not assigned from a semi-persistent scheduling uplink grant;
a different carrier on each transmission opportunity;
at least one uplink carrier with a grant in a current subframe;
a carrier associated with a carrier specific MAC control element to transmit the MAC control element; and
a virtual uplink carrier communicating with an evolved Node B scheduling a carrier the MAC control element is associated with.

* * * * *